E. P. LINDAHL.
METHOD OF AND APPARATUS FOR MANUFACTURING GLASSWARE.
APPLICATION FILED OCT. 14, 1918.

1,390,626.

Patented Sept. 13, 1921.
10 SHEETS—SHEET 1.

INVENTOR

E. P. LINDAHL.
METHOD OF AND APPARATUS FOR MANUFACTURING GLASSWARE.
APPLICATION FILED OCT. 14, 1918.

1,390,626.

Patented Sept. 13, 1921.
10 SHEETS—SHEET 2.

INVENTOR
Erick P. Lindahl,

E. P. LINDAHL.
METHOD OF AND APPARATUS FOR MANUFACTURING GLASSWARE.
APPLICATION FILED OCT. 14, 1918.

1,390,626.

Patented Sept. 13, 1921.
10 SHEETS—SHEET 3.

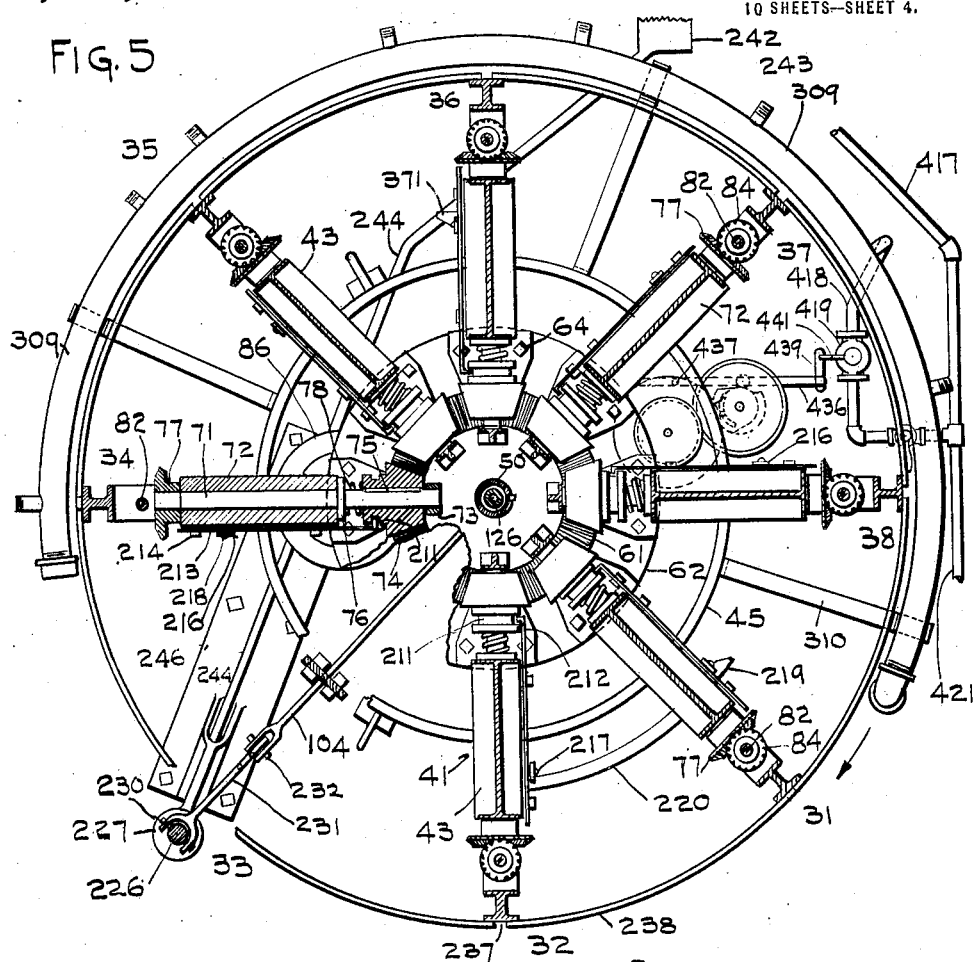

E. P. LINDAHL.
METHOD OF AND APPARATUS FOR MANUFACTURING GLASSWARE.
APPLICATION FILED OCT. 14, 1918.
1,390,626.
Patented Sept. 13, 1921.
10 SHEETS—SHEET 5.
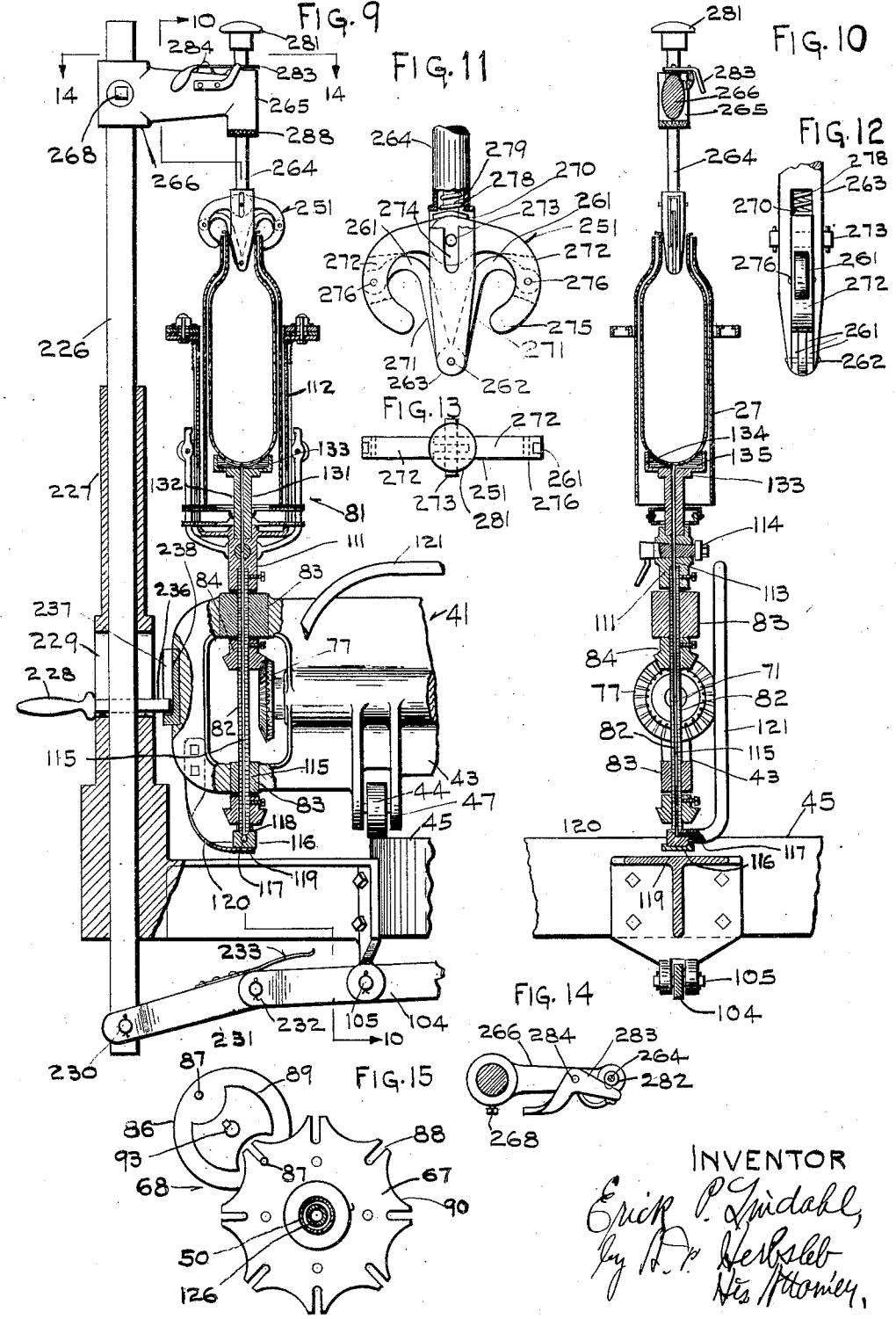
INVENTOR
Erick P. Lindahl,
by B. P. Herbsleb
His Attorney E. P. LINDAHL.
METHOD OF AND APPARATUS FOR MANUFACTURING GLASSWARE.
APPLICATION FILED OCT. 14, 1918.
1,390,626.
Patented Sept. 13, 1921.
10 SHEETS—SHEET 6.
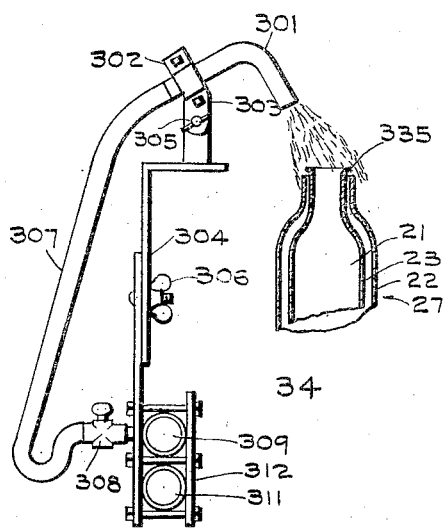
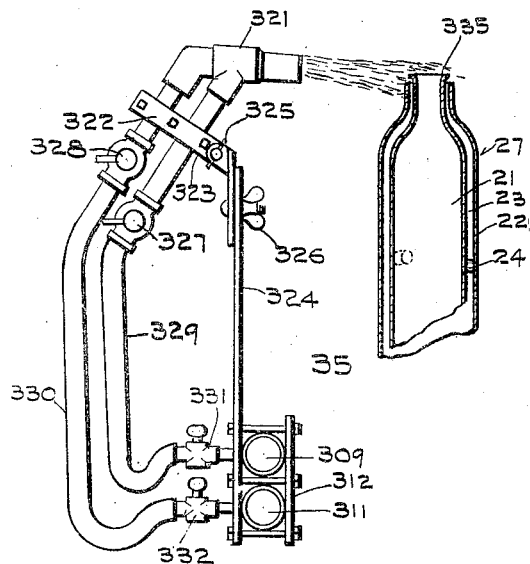
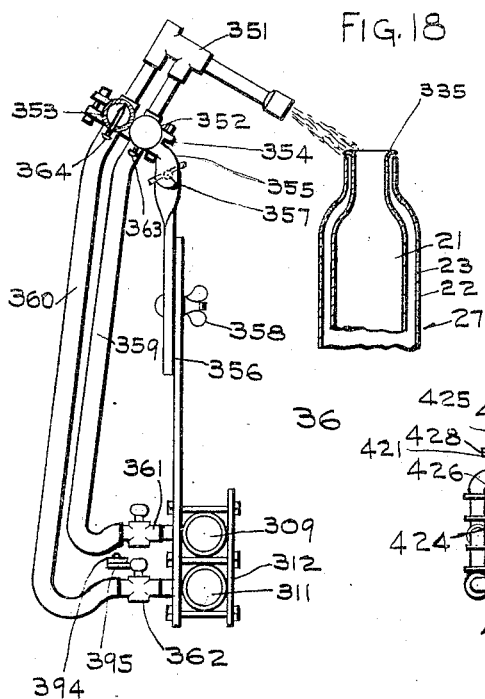
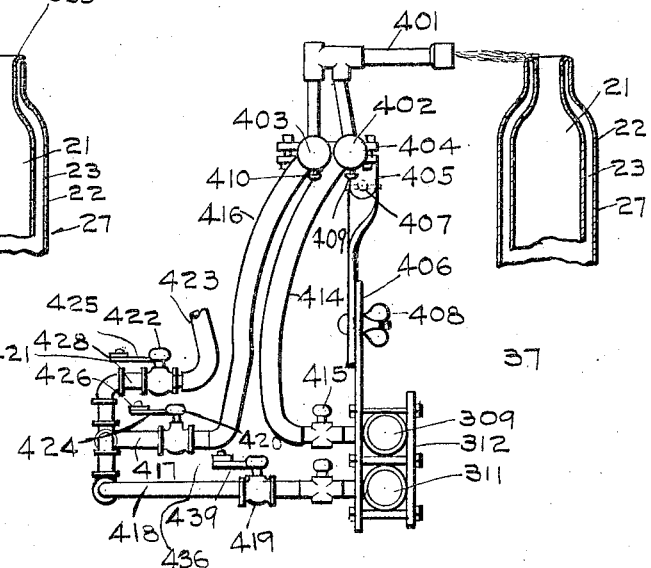

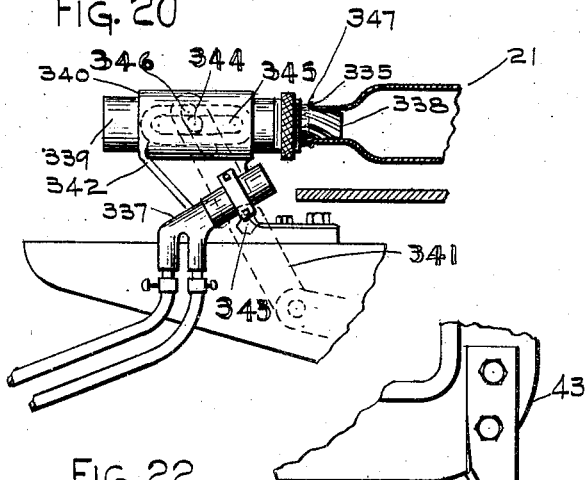
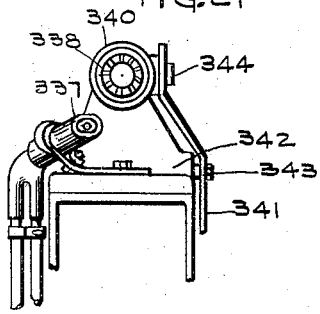
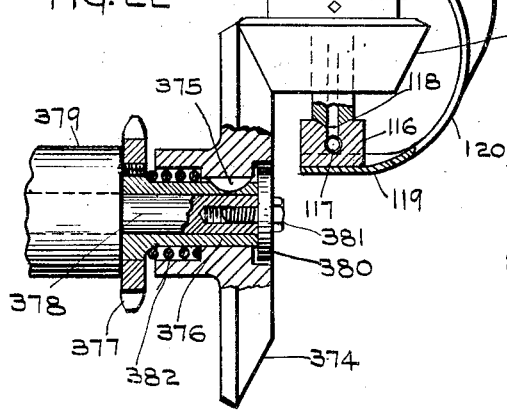
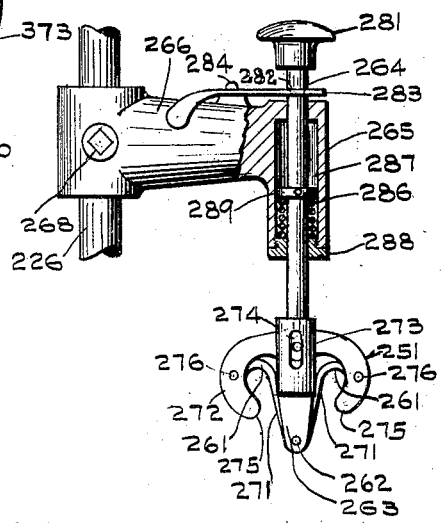
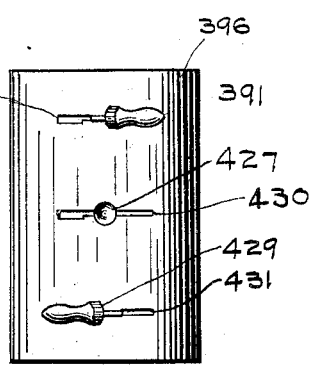

E. P. LINDAHL.
METHOD OF AND APPARATUS FOR MANUFACTURING GLASSWARE.
APPLICATION FILED OCT. 14, 1918.
1,390,626.
Patented Sept. 13, 1921.
10 SHEETS—SHEET 8.
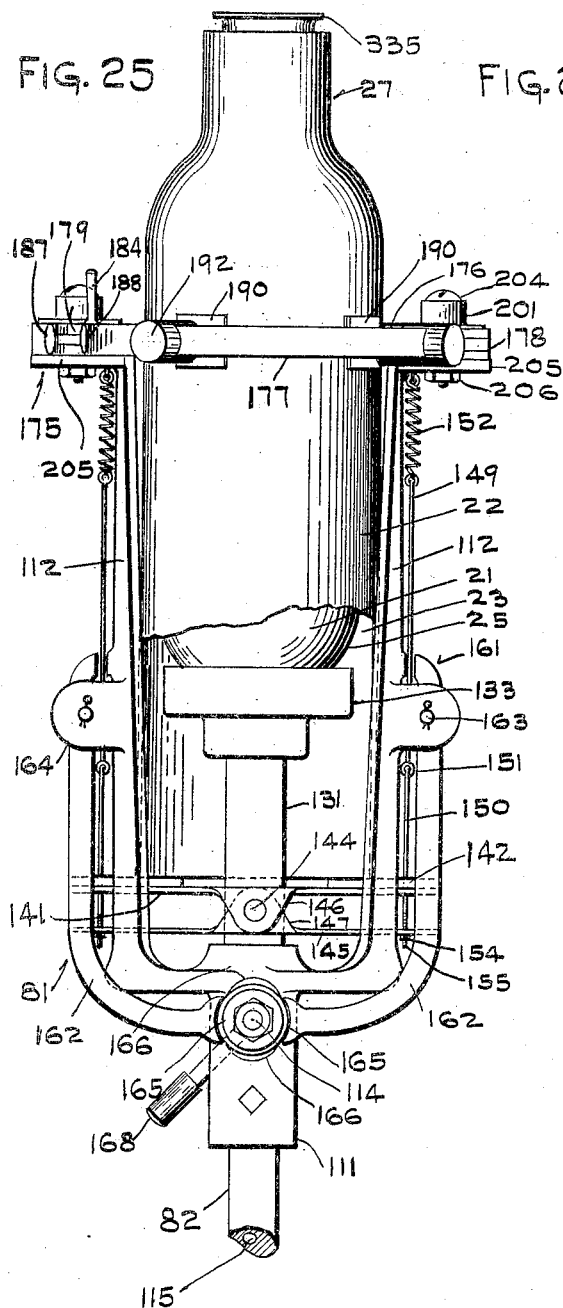
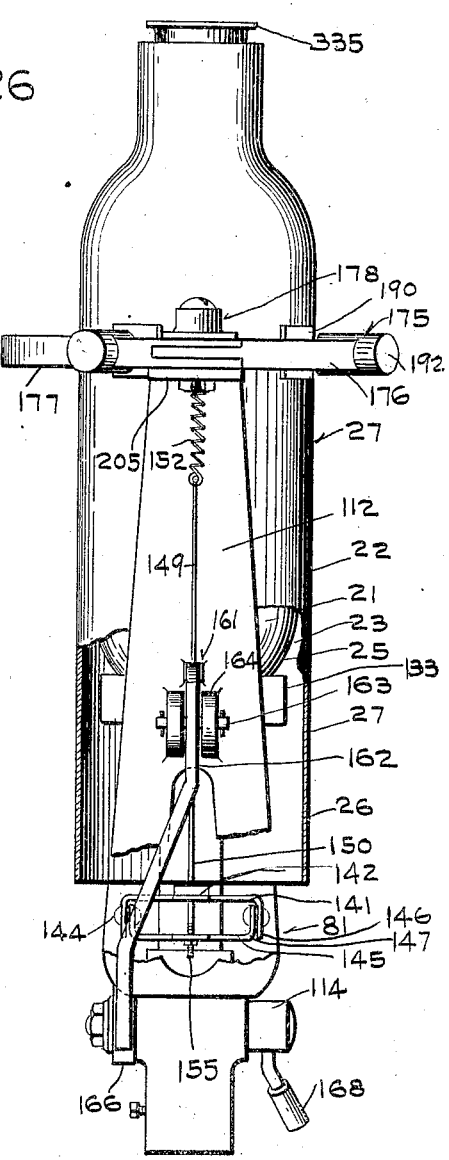
INVENTOR
Erick P. Lindahl, E. P. LINDAHL.
METHOD OF AND APPARATUS FOR MANUFACTURING GLASSWARE.
APPLICATION FILED OCT. 14, 1918.
1,390,626.
Patented Sept. 13, 1921.
10 SHEETS—SHEET 9.
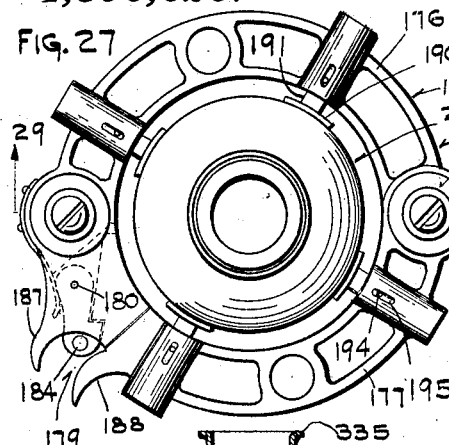
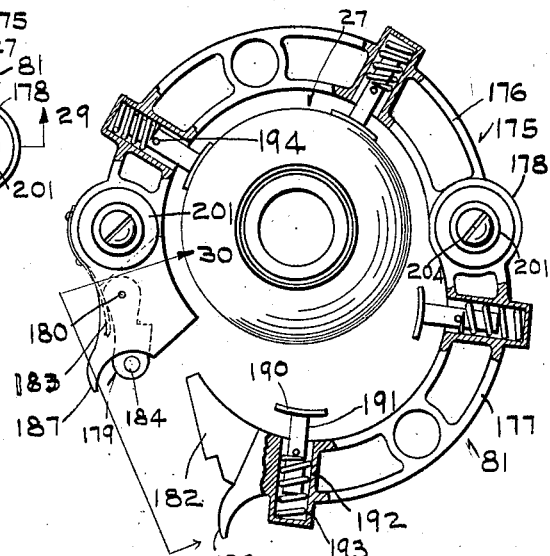
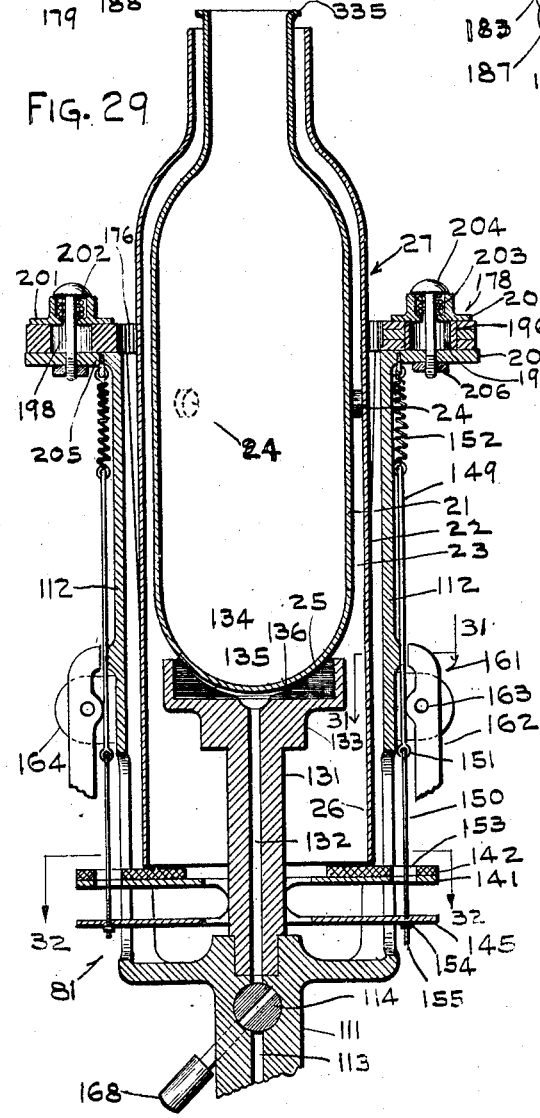
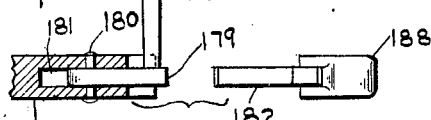
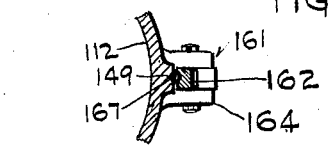

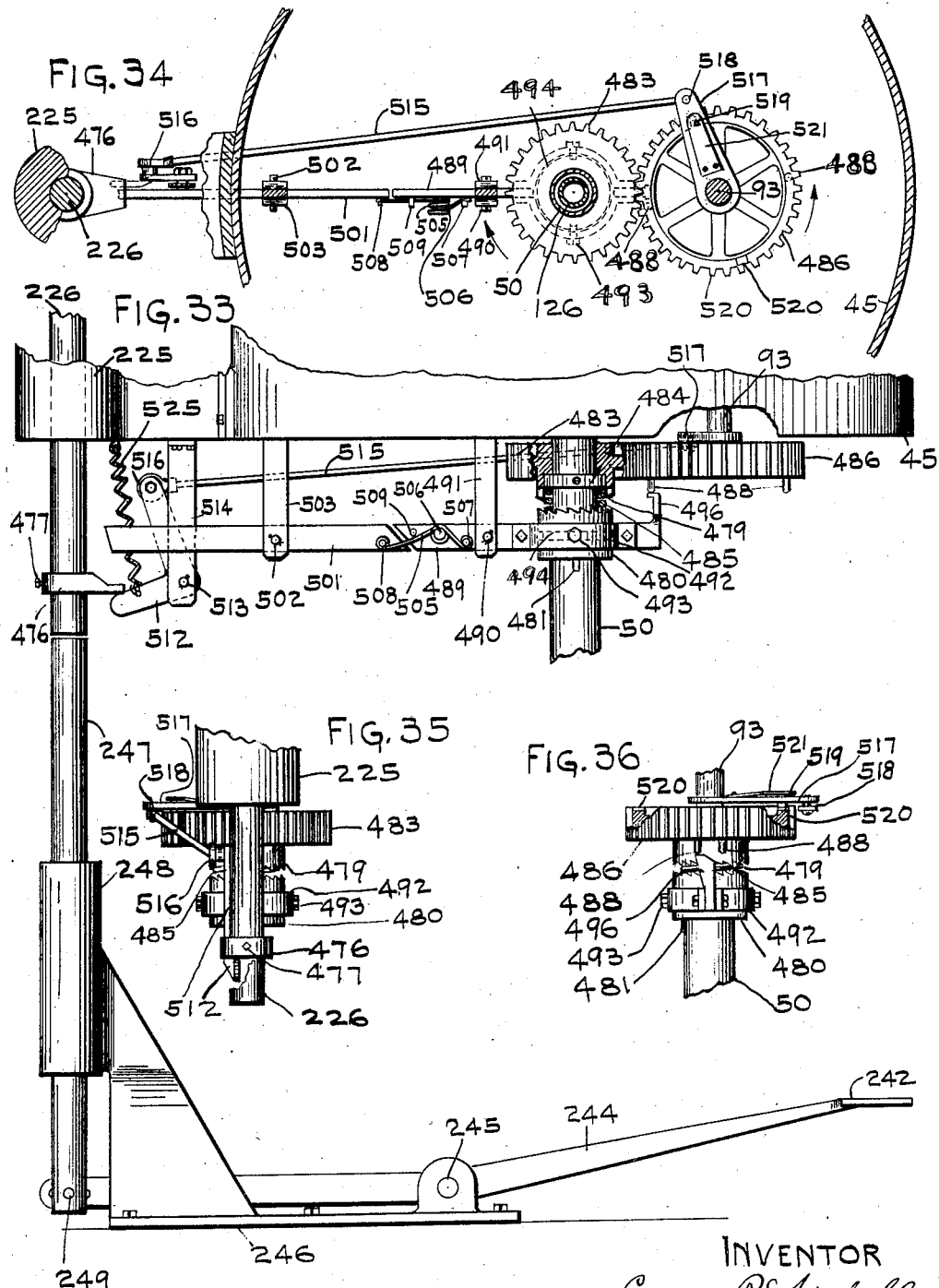

UNITED STATES PATENT OFFICE.

ERICK P. LINDAHL, OF CINCINNATI, OHIO, ASSIGNOR TO THE ICY-HOT BOTTLE COMPANY, OF CINCINNATI, OHIO, A CORPORATION OF WEST VIRGINIA.

METHOD OF AND APPARATUS FOR MANUFACTURING GLASSWARE.

1,390,626. Specification of Letters Patent. Patented Sept. 13, 1921.

Application filed October 14, 1918. Serial No. 257,999.

*To all whom it may concern:*

Be it known that I, ERICK P. LINDAHL, a citizen of the United States, residing at Pleasant Ridge, in the city of Cincinnati, county of Hamilton, and State of Ohio, have invented certain new and useful Improvements in Methods of and Apparatus for Manufacturing Glassware, of which the following is a specification.

It is the object of my invention to provide a new and improved method whereby to connect proximate pieces of glass and apparatus to be used in connection therewith. My invention is applicable for connecting the inner and outer walls of a frangible double-walled vessel, employable for instance in vacuum containers, such as vacuum insulated bottles, carafes, and the like, for example of the character of those shown and described in Letters Patent No. 921,099, granted George P. Altenberg, assignee, on an application filed by Emil Fleischhauser, and No. 1,218,036, granted George P. Altenberg, and dated respectively May 11, 1909, and March 6, 1917.

It is the object of my invention further to provide a new and improved method whereby the walls to be connected are centered, so that the ends to be connected, instanced as the mouth ends of the walls, are caused to rotate in concentric paths, and to so relate the edges and cause their rotation in the presence of heat that centrifugal force preferably acting in conjunction with gravity causes an automatic juxtaposing of the edges to be connected, the edges being then fused while rotating in the presence of heat for making a hermetic seal at the joint thus formed.

My invention contemplates further the provision of novel means whereby operating devices are caused to successively act in novel manner on the glass articles being treated. It is the object of my invention further, to provide new and improved means whereby to automatically position the articles being treated at various stations at which sequential operations take place on the material; further, to provide novel means for centering the articles about their axes of rotation and for longitudinally positioning the same; further, to provide novel means for causing the outer edge of the inner wall to spread, and preferably also to droop, so as to connect with the outer edge of the outer wall of the double-walled frangible vessel; further, to provide novel means whereby successive heat treatments are automatically applied to the article being treated, and, further, to provide novel means for causing correlation and coactive relation between the various operating devices and the material.

The invention will be further readily understood from the following description and claims, and from the drawings, in which latter:

Fig. 5 is a horizontal cross-section of the same taken in the plane of the line 5—5 of Fig. 4, partly broken away, the bearing and gears of one of the horizontal shafts being shown in section taken in the horizontal plane of the axis of the shaft.

Fig. 6 is a side elevation of the automatic heat control means.

Fig. 7 is an end view of the same, partly in section on the line 7—7 of Fig. 6.

Fig. 8 is a vertical cross-section of the same, taken on the line 8—8 of Fig. 3.

Fig. 9 is a vertical axial section of the centering means taken on the line 9—9 of Fig. 2 with the centering tool in lowered position.

Fig. 10 is a vertical axial section of the same, taken on the irregular line 10—10 of Fig. 9.

Fig. 11 is a side elevation of centering tool, partly in axial section.

Fig. 12 is an edge elevation of the same.

Fig. 13 is a plan view of the same.

Fig. 14 is a cross-section of the same taken on the line 14—14 of Fig. 9.

Fig. 15 is a plan section of the table driving means, taken in the plane of the line 15—15 of Fig. 4.

Fig. 16 is a diagrammatic representation of the warming means for warming the edges to be joined, looking in the direction of the line 16—16 of Fig. 2.

Fig. 17 is a diagrammatic representation showing the preheating means for preheating the edges to be joined, viewed in the direction of the line 17—17 of Fig. 2.

Fig. 18 is a diagrammatic representation of the heating means and showing the result of the centrifugal force on the inner vessel in the presence of heat, viewed in the direction of the line 18—18 of Fig. 2.

Fig. 19 is a diagrammatic representation showing the action of the sealing flame on the article, viewed in the direction of the line 19—19 of Fig. 2.

Fig. 20 is a side elevation of flanging means for the inner member, the inner member being shown in axial section.

Fig. 21 is an end view of the same, with the inner member removed.

Fig. 22 is a detail in side elevation, partly in axial section, showing the driving means for centrifugal action on the blank.

Fig. 23 is a side elevation of the centering means, the mounting thereof being partly in axial section.

Fig. 24 is a rear elevation of the shifting means for controlling the flames.

Fig. 25 is a side elevation of the blank holding means, showing the blank partly broken away.

Fig. 26 is an edge elevation of the same, partly broken away.

Fig. 27 is a plan view of the same in closed relation.

Fig. 28 is a similar view of the same, in open relation, and showing the spring receiving pockets thereof in axial section.

Fig. 29 is a vertial axial section of the same, taken on the line 29—29 of Fig. 27.

Fig. 30 is a detail of the clamping means for the blank, shown in vertical section on the line 30—30 of Fig. 28.

Fig. 31 is a horizontal cross-section showing a detail, taken on the line 31—31 of Fig. 29.

Fig. 32 is a plan section taken in the plane of the line 32—32 of Fig. 29.

Fig. 33 is a side elevation of a modification of the driving means.

Fig. 34 is a plan view of the same.

Fig. 35 is a front end elevation of same, partly broken away; and,

Fig. 36 is a rear end elevation of the same, partly broken away.

Figure 1:
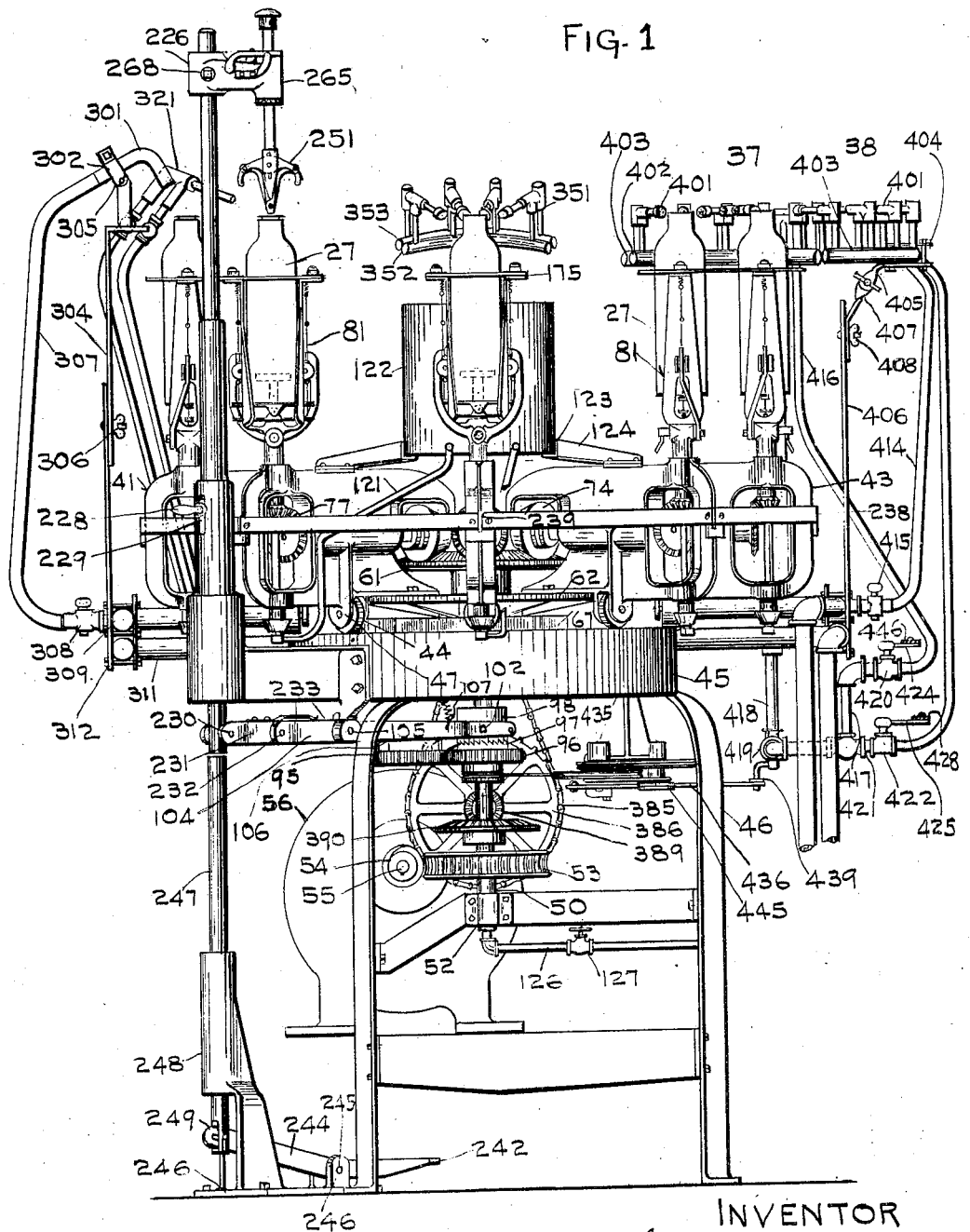
Figure 1 is a front elevation of an exemplified apparatus by means of which my improved method may be performed.

I do not herein claim the clutching mechanism herein shown and described, having shown, described and claimed the same in a copending application, duly executed on December 27th, 1919, and filed in the United States Patent Office December 29, 1919, as Serial No. 348,028, and as a division hereof.

The article being treated is represented as an inner member 21 and an outer member 22, which are blanks which are manipulated to form respectively the inner wall and the outer wall of a vacuum insulated bottle, the walls having a space 23 between them, there being suitable separators 24, instanced as located between the members for forming said space and holding the members in relatively separated relation. (See Figs. 16, 17, 18, 19, 25, 26 and 29.) The inner member is exemplified as provided with a rounded bottom 25. The outer member is shown as bottomless but having the skirt 26, which afterward is formed into an outer bottom about the rounded bottom 25. The space 23 is in a subsequent operation exhausted to form the vacuum between said walls. I shall hereinafter refer to this assembled element as a blank, designated by the general numeral 27, it being understood however that the invention is not limited to the parts shown and described, or assembled in the manner shown and described, the invention being applicable to any character of blank capable of receiving the operations thereon hereinafter described for connecting proximate surfaces or edges.

I have exemplified my improved method as performed by an assembled machine in which the steps of the method are in the main automatically performed on the blank, it being understood, however, that the steps of the method may be performed on the blank either by mechanical means of by hand manipulation, as may be desired.

I have illustrated a machine in which the blanks are suitably supported and rotated, and also caused to move in a planetwise path, the movement in the latter path being arrested at various stations at which various operations are performed.

Figure 2:
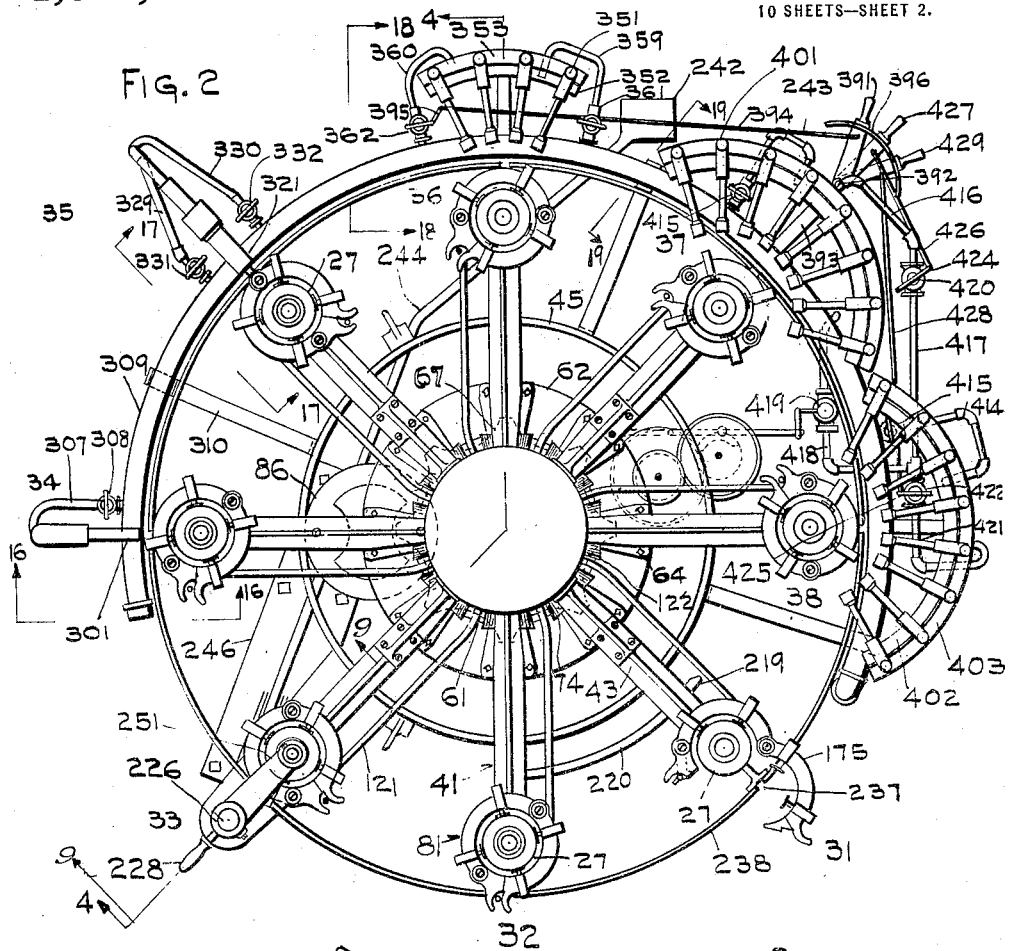
Fig. 2 is a plan view of the same.
Figure 3:
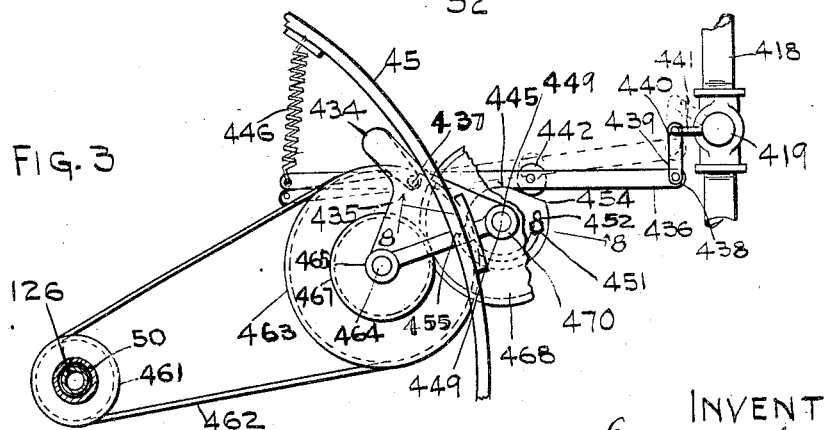
Fig. 3 is a plan view detail, partly broken away, showing automatic heat control means.

In the present exemplification eight of these stations or at-rest positions are instanced, although a greater or less number may be employed if desired. (See Figs. 2 and 5.) The stations may be instanced as a discharging station 31, which may also serve as a charging station; a station 32, which may serve as an idle station, or, if desired, as a charging station; a blank centering station 33; a warming station 34; a preheating station 35; a centrifugal station 36; a sealing station 37, and an additional sealing station 38.

There is a carrier 41, on which the blanks are suitably mounted for being intermittently moved in a path of travel, the blanks being rotated while in at-rest positions, and preferably also in their paths between at-rest positions.

The carrier comprises brackets 43, which extend radially with relation to the carrier. (See Figs. 1, 2, 4 and 5.) The brackets are provided with wheels 44, the wheels having a circular path on a circular runway 45, rigidly secured to the main frame 46. The wheels are journaled in forks 47, depending from the brackets.

50 is a vertical drive-shaft, journaled in bearings 51, 52, of the main frame. The drive-shaft is suitably driven, as by means of a worm-wheel 53 fast thereon, with which a worm 54 meshes, the worm being fixed to a shaft 55, driven by an electric motor 56, suitably fixed with relation to the frame of the machine.

A gear 61, instanced as a bevel friction-gear, is fixed to the drive-shaft. The carrier comprises a center-piece 62, to which the various brackets are fixed by bolts 64, the center-piece having a bearing 65 about a hub 66 of a gear 67 loose about the drive-shaft. The gear 67 is instanced as the star-wheel of a Geneva movement device 68. The bearing 65 is fixed to the gear 67 by bolts 69. The gear 67 is supported on the bearing 51. (See Figs. 1, 4 and 15.)

Shafts 71 are journaled in bearings 72, 73, of the brackets 43. (See Figs. 4 and 5.) Each of the shafts 71 is provided with a pinion 74, exemplified as a bevel friction-pinion arranged to coact with the bevel friction-gear 61. It has spline-connection 75 with the shaft 71 to permit endwise movement of the pinion into and out of driving engagement with the gear 61. The shaft 71 is held endwise in the bearing 72 by a collar 76 fixed to said shaft and impinging one end of said bearing and a bevel-gear 77 fixed to said shaft at the other end of said bearing. A spring 78 between the collar 76 and the friction-pinion 74 causes driving relation between said pinion and the friction-gear 61.

The blanks are mounted in chucks 81. Each of the chucks is exemplified as fixed to a vertical shaft 82, journaled in bearings 83 of the bracket 43, and held in endwise relation in said bearings by means of said chuck and a bevel-gear 84 fixed to said shaft and bearing against the respective ends of one of the bearings 83. Bevel-gear 84 meshes with the bevel-gear 77. (See Figs. 4, 5, 9 and 10.)

Operation of the carrier is by means of a Geneva movement device, as stated. The star-wheel 67 of the Geneva movement device is fixed to the carrier. The pin disk 86 of the Geneva movement device is provided with pins 87, which coact with slots 88 in the star-wheel. (See Figs. 2, 4 and 15.) Hub-sectors 89 of the pin-disk coact with arc-recesses 90 in the star-wheel while the carrier is in its at-rest positions.

The pin-disk is fixed to a vertical shaft 93, journaled in a bearing 94 of the main frame. A gear 95 is fixed to said shaft, and is meshed by a gear 96 integral with one of the members of a clutch 97, the other member of said clutch being on a sleeve 98, which has spline-connection 99 with the drive-shaft 50. The sleeve is provided with an annular slot 101, in which pins 102 of a yoke 103 are received. (See Figs. 1 and 4.)

The yoke is on a lever 104 pivoted on a pin 105 to the main frame. The lever is arranged to be operated for moving the clutch into and out of engagement. When the clutch is in engagement, motion is transmitted from the drive-shaft through the clutch to the gear 96, thence to the gear 97, shaft 93 and pin-disk 86, for rotating the latter one-half revolution, and thereby advancing the carrier one-eighth of a circle, and advancing the various blanks thereon to the next at-rest positions or stations.

When the carrier has completed such one-eighth revolution, the clutch 97 is automatically disengaged by means of a trip 106, of which there are two on the gear 95, so that when one of the trips 106 is in coactive relation with the lever 104, the clutch 97 is disengaged, the trip passing the lever just sufficiently to allow reëngagement of the clutch for the next stepwise rotation of the carrier. A spring 107 between the frame and the lever normally maintains the clutch in disengaged relation after the same has been disengaged by means of the trip 106.

The chucks 81 for receiving the blanks are each exemplified as provided with means for permitting shifting of the blank in the chuck whereby to center the walls of the blank with relation to each other and to center the blank with relation to its axis of rotation, and with means whereby the longitudinal relation of the inner and outer members of the blank is fixed, in order that the edges of the blank which are to be united have a definite relation and have a definite path of rotation imparted to them.

The chuck comprises a base 111, from which standards 112 extend upwardly. (See Figs. 25 to 32.) The base is shown provided with a passage 113, and with a valve 114 for said passage. This passage communicates with a passage 115 in the vertical shaft 82, this vertical shaft being shown as a hollow shaft. There is a coupling 116 under the vertical shaft which has a passage 117 therethrough, the latter passage communicating with the passage 115 in the vertical shaft by means of a conical joint 118, permitting rotation of the shaft with relation to the coupling. (See Figs. 9, 10 and 22.) The coupling is resiliently held toward the shaft 93 by being seated in a seat 119 of a spring-clip 120 secured to the bracket 43. The seat encompasses the coupling preferably in manner to prevent its rotation.

A tube 121 extends from the coupling 116 and connects with a suitable source of suction or vacuum for normally causing suction or vacuum in the passages 117, 113, and 115. The tube is preferably a flexible tube and is exemplified as connecting with a tank 122, supported in seats 123 of arms 124 secured to the brackets.

The tank forms a reservoir for the suction or vacuum so that there shall be a plentiful supply of suction or vacuum adjacent to the chucks, in order that, if any of the chucks are without blanks therein while the passage 113 remains open, the influx of air occasioned thereby into the tank may not unduly reduce the suction or vacuum. The suction or vacuum in the tank is supplied from a suitable pipe 126, extending through the drive-shaft 50, which is shown as a hollow shaft, from a suitable source of suction or vacuum, the pipe 126 preferably having a regulating valve 127 therein. The tank rotates with the carrier, while the pipe 126 is preferably stationary, for permitting which there is preferably a conical joint 128 between said pipe and the tank, a passage 129 therethrough connecting the pipe and tank. (See Figs. 1, 4 and 5.)

The chuck 81 further comprises a support 131, shown as a pedestal, having a passage 132 therethrough, connecting with the source of suction or vacuum. (See Figs. 25 to 32.) The support comprises a suction-chuck 133, comprising a cup 134, in which there is a seat 135 for the inner member of the blank, this seat being preferably of cushion material, for instance of leather or rubber, and having a concave recess 136, in which the rounded bottom of the inner member of the blank is arranged to be received, the recess in the seat being preferably deeper than the portion of the blank received therein so that the wall of the recess may throughout its preferably flexible annular outer edge have close contact made therewith by the blank. The passage 132 communicates with this recess.

The lower ends of the outer members of the blank are in practice often of irregular form. It is desirable that the axial relation between the inner and outer members of the blank shall be maintained when positioned in the chuck. In order to allow for irregularity in the lower end of the outer member, I provide a rocking seat for said lower end, and yielding means arranged to yield by pressure thereon of the outer member when seating the inner member in the suction-chuck, and means whereby to fix the relation between the seat of the inner member and the seat of the outer member when proper relative positions between the seats have been assumed.

Instancing this arrangement, (see Figs. 25 to 32), 141 is a rockable plate, having a narrow cushion 142 thereon, to permit the blank to rock laterally, arranged to receive the lower edge of the skirt 26 of the outer member of the blank. The plate 141 rocks on pins 144 on a plate 145. The plates 141 and 145 respectively have ears 146, 147, in which the pins are received. The plate 145 is supported on links 149, 150, shown as wires, having articulation 151 between them, the articulation being formed by the ends of said wires. The upper ends of the links are supported from the upper end of the standards 112 by means of springs 152, shown as helical springs, the respective ends of which are connected with the standards and the links 149.

The links 150 pass through openings 153 in the cushion 142 and plate 141, and have connection with the plate 145, as by means of nuts 154 threaded about the lower threaded ends 155 of the links 150, thus providing adjustment for normal position of the plate 145.

Clamps 161 are provided for fixing the links in assumed positions, and thereby fixing the position of the support for the outer member with relation to the inner member of the blank. The clamps have their respective clamping faces on the standards 112 and on levers 162. The levers are pivoted at 163 to ears 164 extending from the standards. (See Figs. 25, 26, 29 and 31.)

The levers 162 are provided with cam-faces 165, with which cams 166 coact for clamping the clamps 161 upon the wires received through said clamps, the clamp faces being provided with suitable grooves 167 in which the wires are held. The cams 166 are on the stem of the valve 114. The cams and valve are arranged to be operated by a handle 168.

Each of the chucks 81 is provided with means for holding and permitting adjustment of the mouth end of the blank, exemplified as a clamp 175, represented as comprising segments 176, 177, connected by a hinge 178 for permitting swinging of one segment on the other, whereby to open the clamp and permit insertion and removal of the blanks. (See Figs. 25 to 30.) When the blank is inserted, the clamp is arranged to be closed and to be held in closed position by means of a clasp 179, instanced as comprising a pivoted member, pivoted by a pivot 180 to the segment 176, and moving in a slot 181 in said segment. The clasp is urged into engaging relation with a keeper 182 on the segment 177 by means of a spring 183. The keeper is arranged to be received in said slot when closing the segments. The clasp is arranged to be released by a lug 184. The segments are provided with ears 187, 188, so constructed as to be grasped by the fingers for pressing the segments together at the clasp and for readily opening the same. The clamps preferably rotate with the hinge-end of the segment 177 moving in advance of the clasp-engaging end thereof, for ease in closing the clamp and to prevent accident.

The segments are provided with shoes 190 on stems 191, received in pockets 192 in the segments. Springs 193 in the pockets impinge pins 194 on the stems, urging the shoes toward the blank in the clamp. The pins are received in slots 195 in the walls of the pockets for limiting their endwise movements and holding the shoes in proper relation with the blank.

When the clamp 175 is clamped about the blank, the shoes are arranged to contact the blank so as to firmly hold the blank within the segments when the segments are clasped together, and thereby centrally position the blank in the clamp. The springs 193 exert firm pressure by the shoes upon the blank, but are sufficiently yieldable to prevent breakage of the blank.

The clamp 175 forms a slide which has sliding relation with the body of the chuck, this sliding being resisted preferably by friction of less resistance than the resistance of the coacting springs 193, so as to permit shifting of the slide upon the body of the chuck without derangement or movement of the shoes on said slide, whereby the definite relation between the blank and the slide fixed by said shoes is maintained and any shifting which is caused, for instance, by the centering device to be presently described, takes place by a shifting of the slide.

The hinge 178 of the segments comprises a bushing 196, through which there is a recess 197. There is a recess 198 in the segment 176. Friction-plates 201 bear on the slide and are provided with pockets 202, in which springs 203 are located. Bolts 204 are threaded into threaded openings in flanges 205 of the standards 112, jam-nuts 206 being threaded about the ends of the bolts. The springs 203 are received between the heads of the bolts and the bottoms of the pockets, and urge frictional engagement between the friction plates 201 and the slide and between said slide and the flanges 205. The recesses 197, 198, are of substantial area with relation to the bolts 204 to permit lateral shifting between said slide and the body of the chuck in all directions.

In the present exemplification, the blank is intended to be inserted into the chuck at one of the charging stations 31 or 32, preferably at the station 31, at which latter station the blank which is finished is also discharged, the discharging taking place by the opening of the chuck and the removal of the blank. The charging takes place by the insertion of a fresh blank. When the finished blank is about to be discharged, the valve 114 is closed so as to shut off the suction or vacuum from the chuck. The closing of this valve also releases the clamps 161.

Rotation of the chuck at the station 31 is caused to cease so that discharging and recharging of the blank in the chuck can be conveniently had. The cessation of rotation is accomplished by automatically moving the friction-pinion 74 out of friction engagement with the friction-gear 61, accomplished by providing the friction-pinion with an annular slot 211 for receiving the tines of a fork 212 on a slide 213, having sliding connection on the bracket, as by means of shoulder bolts 214 passing through slots 215 in said slide and threaded into the bracket. (See Figs. 4 and 5.) A lever 216 is pivoted to the bracket at 217 and has articulation 218 with said slide. The free end of the lever is arranged to strike a cam 219, fixed to the frame at the station 31, whereby the free end of the lever is moved for moving the slide and thereby moving the friction-pinion 74 away from the friction-gear 61, resisted by the tension of the spring 78.

When the bracket moves away from the charging station or stations, the lever 216 moves out of range of the cam 219, whereby the spring 78 again urges the friction-pinion 74 into engagement with the friction-gear 61, thereby again rotating the chuck. The cam 219 may continue as a disengaging bar 220 for maintaining disengagement between the friction-pinion 74 and the friction-gear 61 throughout the movement of the bracket from the station 31 to the station 32, and throughout the time of stoppage of said bracket at the station 32, the lever 216 moving past the disengaging bar at the next intermittent movement of the carrier. By this arrangement the discharging and charging of the blanks may take place at either or both of the stations 31 and 32.

When, now, the fresh blank is inserted, it is moved into the chuck until the rounded bottom of the inner member is seated in the seat 135. The bottom end of the outer member has meanwhile contacted the cushion on the rockable plate 141 for rocking this plate to cause it to conform to the bottom end of the outer member, and to move axially, resisted by the tension of the springs 152, to move the plates 141, 145, axially of the blank, the plates yielding readily so as to cause no derangement between the inner member and the outer member of the blank, it being understood that the members are preferably assembled in proper relation prior to being placed in the chuck.

The seating of the rounded bottom of the inner member in the seat 135 of the chuck acts to center the bottom end of the blank with relation to the chuck. The segments are then closed for closing the slide 175 at a position nearer the mouth end of the blank than said rounded bottom, so that the sliding movement of the slide will permit lateral shifting of the mouth end of the blank.

Valve 114 is then opened, thereby also clamping the clamps 161 about the tension members 149, whereby the supports for the inner member and outer member are relatively fixed.

An intermittent motion of the carrier is then caused, as by engagement of the clutch 97, accomplished in the present exemplification either by hand or treadle means. (See Figs. 1, 2, 4, 5 and 9.)

A vertically movable rod 226 has axial movement in a standard 227, and is actuated by a handle 228, operating in a slot 229 of the standard. The rod is articulated at 230 with a link 231, articulated at 232 with the lever 104. A spring 233 fixed to the link causes pressure on the lever, when the lever and the link are in extended relation, and the rod is being moved upwardly, so as to cause the link and lever to move together to engage the clutch, however permitting the clutch-sleeve to move for disengagement of the clutch in case of abnormal resistance in the driving means, thereby acting as a safety device for preventing breakage.

The movement of the handle 228 has also caused disengagement of a latch 236 from one of a series of slots 237 in the carrier. Segment-bars 238 are arranged between the slots, the latch being arranged to ride on these segment bars during rotative movement of the carrier. The segment-bars rigidly connect the outer ends of the brackets 43. The latch serves to determine definite stopping relation of the carrier, and is led into the slots by inclines 239.

The treadle means are exemplified as comprising a treadle 242, within reach of the main operator, whose station is approximately indicated at 243. (See Figs. 1, 2, 4 and 5.) The treadle is on a lever 244 pivoted at 245 to a floor-piece 246. A rod 247 is longitudinally movable in a bearing 248 of the floor-piece, the treadle-lever being articulated with the rod by an articulation 249. The upper end of the rod 247 is arranged to contact the rod 226 for raising the latter and thereby raising the latch 236 out of engagement with the slot 237 for permitting the carrier to move, engagement of the clutch 97 taking place after said latch is disengaged, whereby driving connection with the carrier is made, and the carrier advances the distance between neighboring stations, the operator having in the meantime removed the foot from the treadle.

The blank is thereby moved to the centering station 33, where it is subjected to the action of a centering device 251.

The centering device is exemplified as comprising means for centering the blank and for centering the inner member and outer member with relation to each other so as to locate the mouth ends of the inner member and outer member concentric. The space 23 between the members is determined by the separators 24. There are preferably three of these separators arranged about the circumference of the inner member. The separators are preferably so arranged as to act as fulcrums on which the inner and outer members relatively pivot when relatively centering said members, to arrange the walls of the members relatively concentric.

The centering device comprises inner contact-parts and outer contact-parts, which are pivoted together in such relation as to have coördinate movement, and to cause equal contact between the inner contact-parts and the inner face of the inner member, and between the outer contact-parts and the outer face of the outer member, when both said members are centered about the axis of rotation of the blanks. The contact-parts are preferably of hard fiber or have hard fiber facings at the points of contact with the members of the blank.

The inner contact-parts are shown as comprising arms 261, pivoted at their lower ends by a pivot 262 to the lower end of a fork 263, the tines of which extend downwardly. (See Figs. 9 to 14.) The fork is on a stem 264, located in a bearing 265 of a bracket 266, secured by a clamp-bolt 268 in adjusted positions lengthwise of the rod 226.

The centering device is so positioned with relation to the shaft 82 that the axis of the stem 264 and the axis of rotation of the shaft 82 are coincident, whereby the center of the centering device is coincident with said axis of rotation.

The arms 261 have contact-faces 271, which are preferably slanting with relation to each other for forming a combined tapering contact-part. The contact-faces 271 are arranged to contact the inner face of the inner member. Arms 272 are pivoted together at their inner ends on a pin 273, movable in a slot 274 extending lengthwise of the fork 263. The arms 272 are provided with contact-faces 275, shown rounded. They act inwardly to contact the outer face of the outer member. The arms 261 and 272 are articulated together by pins 276, between the outer ends of the inner arms and intermediate points of the outer arms. The connections between said arms and said stem cause definite relations of movement between the inner and outer arms and thereby, by contact of the inner arms with the inner face of the inner member and contact of the outer arms with outer face of the outer member, cause relative centering movement between both said members. The contact-faces are preferably held in normally separated relation by means of a light spring 278 received in a socket 279 in the stem 264 and bearing against a washer 270 resting on the inner ends of the arms 272.

The blank preferably rotates during its passage between the station 32 and the station 33. On arrival at the station 33 the latch 236 passes into the upper end of the slot 237, with the centering device positioned above the blank. (See Figs. 1 and 4.) Movement of the device toward the blank is then caused. The inner arms 261 pass into the inside of the inner member of the blank, and the outer arms 272 are received about the outside of the mouth end of the outer member of the blank. (See Figs. 9 and 10.) When the tapering contact faces 271 contact the inner face of the inner member, further movement of the centering device axially of the blank causes the tapering contact-faces to ride on said inner face, swinging said contact-faces inwardly, and, by means of the connection of the inner arms with the outer arms, moving the contact-faces of the outer arms toward the outer face of the outer member, which movements continue until there is equal contact between the contact-faces of the inner arms and the inner face of the inner member and the contact-faces of the outer arms with the outer face of the outer member, when the blank is centered.

The centering device is exemplified as arranged to be operated either manually or automatically. The stem 264 has longitudinal movement in the bearing 265 and is provided with a handle 281. The stem is provided with an annular groove 282, in which a latch 283, pivoted at 284 to the bracket is received, for holding the centering device in depressed position with relation to the operating rod 226, so that centering movement of the centering device will be automatic in connection with the movement of the rod, the rod and centering device descending by gravity to cause automatic centering of the blank. The latch is released when it is desired to manually operate the centering device.

A spring 286 is located about the stem 264 in a socket 287 in the bearing 265, (see Fig. 23) between a nut 288 in said bearing and a collar 289 on the stem. The spring normally retracts the centering device from the blank. Pushing on the handle 281 causes approach of the centering device toward the blank in the centering movement, when centering the blanks manually.

Rotation is permitted between the centering device and its bearing so that if the frictional contact between the rotating blank and the centering device becomes so great as to be in danger of breaking the blank, then rotation of the centering device is permitted. The centering device is normally non-rotating.

The blank next advances to the station 34, which is instanced as a warming station, at which the ends of the blank to be sealed are warmed to prepare them for the greater heats of the subsequent fires, and to temper the ends of the glass throughout a sufficient part of their lengths to prevent cracking or crazing. The flame at station 34 is directed toward the mouth ends of the members of the blank, preferably in a direction at an acute angle to the axis of the blank, and preferably as a spreading flame, by means of a burner 301. (See Figs. 1, 2 and 16.)

The burner is secured in a clamp 302 of a clamp-piece 303, pivotally clamped in adjusted positions to a support 304 by means of a pivot-clamp 305. The support is extensible, as by making the same of a plurality of sections longitudinally adjustable with relation to each other, and held in adjusted positions by means of a clamp 306. The construction permits adjustment of angle and distance of the burner 301 with relation to the blank. A preferably flexible pipe 307 connnects the burner with a nipple-valve 308 extending from a fuel-main 309, shown as encircling part of the frame of the machine, and suitably secured thereto and supported thereby on brackets 310. A compressed air main 311 is also supported by said brackets, the mains being held in place on the brackets by means of clamps 312. The blank is preferably subjected to an all gas flame at the station 34.

The blank next advances to a station 35, which I designate a preheating station. (See Figs. 1, 2 and 17). There is a burner 321 at this station for projecting a flame against the edges which it is desired to connect for raising the temperature of these edges, and preferably rendering the same nearly plastic, preparatory to receiving the more intense heat of the subsequent burner. The burner 321 is preferably arranged to project a flame of mixed gas and air.

The burner 321 is preferably held in a clamp 322 on a clamp-piece 323, pivotally clamped in adjusted positions to a support 324 by means of a pivot-clamp 325. The support comprises a plurality of parts relatively positioned lengthwise, and held in adjusted positions by a clamp 326. The burner-tubes are provided with valves 327, 328, for regulating the gas and air, convenient to the attendant. Flexible hoses 329, 330, connect the burner-tubes with nipple-valves 331, 332.

The blank next advances to station 36, at which the blank is subjected to an intense heat and an accelerated speed of rotation, the heat being directed primarily toward the mouth-end of the inner member for rendering said mouth-end plastic, the accelerated speed of rotation causing the plastic mouth-end of the inner member to spread, due to centrifugal force. The weight of the outer edge of the mouth-end of the inner member also causes the same to droop while being subjected to the centrifugal motion, thereby curling to meet the edge of the mouth-end of the outer member.

For aiding in this action, the inner member has been given a preliminary flange 335, for instance by means shown, described and claimed in my copending application, Serial No. 253,106, filed September 7, 1918.

Instancing these means, there is a suitable rotatable chuck holding the inner member in extended relation in suitable manner, prior to its association with the outer member.

(See Figs. 20 and 21.) The flame from a burner 337 of which there may be one or more, is projected upon the mouth-edge of this inner member to render the same plastic. A flanging tool 338 is secured to an axially movable tool-clamp 339, movable axially in a bearing 340, by means of a lever 341, pivoted to the bearing-support 342 at 343, and having articulation with said tool-clamp, the articulation consisting of a pin 344 in the tool-clamp slidable in a slot 345 in the bearing and received in a slot 346 in the lever.

The flame from the burner or burners renders the mouth-edge of the blank or inner member plastic, whereupon axial movement is imparted to the tool for inserting the tool into the mouth-end of the rotating inner member for shaping said mouth-end, the tool being provided with a shoulder 347 which forms the mouth-edge of the inner member into the form of the flange 335. This flanged inner member, in the present exemplification, forms the inner member of the blank 27, and is associated with the outer member in manner hereinafter described. In assembling the members, the mouth-edge of the inner member extends axially slightly beyond the mouth-edge of the outer member, these edges being annular, and the outer edge of the flange at the mouth-end of the inner member projects radially outward.

The heating of the mouth-end of the blank at the station 36, is preferably accomplished by a plurality of burners, arranged partway around the position of the blank so as to project a number of flames simultaneously toward and upon the flanged mouth-end of the inner member. (See Figs. 1, 2 and 18.) The burners are represented as a series of burners 351 shown as extending in radial directions toward the axis of the blank at station 36. These burners are shown fed by a manifold 352 for gas and a manifold 353 for compressed air, the manifolds being held in a clamp 354 of a clamp-piece 355, pivotally clamped in adjusted positions to a support 356 by means of a pivot-clamp 357. The support is extensible, as by making the same of a plurality of sections longitudinally adjustable with relation to each other, and held in adjusted positions by means of a clamp 358.

Flexible hose 359 and 360 connect with the respective manifolds and with nipple-valves 361, 362, respectively in the gas main 309 and the air pressure main 311. Each of the burners is provided with a regulating valve, shown as a needle valve 363, communicating with the burner from the gas-manifold, and with a needle-valve 364 communicating with the burner from the air-manifold.

Suitable means are provided for accelerating rotation of the blank at the station 36, exemplified as a driving means auxiliary to the driving means for rotating the blank hereinbefore mentioned. (See Figs. 1, 4 and 22.)

When the blank approaches the station 36, the lever 216 on the bracket makes contact with a cam 371, whereby the pinion 74 is moved away from the drive-gear 61. (See Figs. 1, 2, 4, 5, 9, 10 and 22.) The upright shaft 82 is provided with a bevel friction-pinion 373, fixed thereto, which, when the bracket comes to at-rest position at the station 36, is brought into operative connection with a bevel friction-gear 374. The bevel-gear 374 has spline-connection 375 with a bushing 376, which has a sprocket-wheel 377 fast therewith. The bushing rotates about a stud-shaft 378 fixed in a bearing 379 of the main frame. A washer 380 is fixed to the end of the stud-shaft by means of a bolt 381 and holds the bushing and the bevel-gear on the stud-shaft. A spring 382 is located about the bushing between the sprocket-wheel and the bevel-gear 374, and normally urges the bevel-gear outwardly so as to insure proper operative engagement between the bevel-gear 374 and the bevel-pinion 373.

A sprocket-chain 385 is received about the sprocket-wheel 377 and a larger sprocket-wheel 386, fixed to a shaft 387, journaled in bearings 388 of the main frame, and provided with a bevel-pinion 389. A bevel-gear 390 fixed to the drive-shaft, rotates the bevel-pinion and drives the blank-supporting shaft 82 at an accelerated speed so as to rotate the blank at an increased and high rate of speed, to cause proper centrifugal motion of the mouth edge of the inner member, that is, a lateral outward spreading of said mouth edge. The mouth edge of the outer member preferably remains firm, due to the more intense heat applied to the mouth-edge of the inner member.

When the operator observes that the edge of the mouth-end of the inner member in its centrifugal action has reached a diameter about equal to the diameter of the outer circumference of the mouth-edge of the outer member, the operator reduces the heat applied to the blank at the station 36 either by reducing the flow of gas or reducing the flow of air, as may be desired, or as the condition of the work may require. The heat and time required to produce proper centrifugal motion to the proper extent varies according to the thickness and texture of the glass. The result of this reduction of heat is a reduction in the ductility of the edge of the inner member of the blank, whereby the centrifugal movement of the same is retarded.

As a convenient means for controlling the supply of gas or air or both gas and air, I provide controlling means, exemplified as controlling the supply of air. The controlling means in the present exemplification, comprises a lever 391 pivoted at 392 to a bracket 393 extending from the frame. (See Figs. 2, 18 and 24.) The lever has a link 394 articulated therewith, the other end of the link connecting with an arm 395 extending rigidly from the plug of the valve 362. An arc-piece 396 is provided at the operator's station 243, a slot 397 being in the arc-piece, the lever extending through the slot and resting therein in adjusted positions.

The blank next advances to one or more sealing stations 37, 38. I have exemplified two of such stations, which are substantial duplicates of each other, the parts at the respective stations being designated by similar reference numerals.

Referring to the sealing station 37, there is a plurality of burners 401, arranged about the position of the rotating blank for projecting flames upon the joint between the edge of the inner member and the edge of the outer member, the edge of the inner member having been laid over upon the edge of the outer member, as hereinbefore described. The flames are projected upon this joint for causing fusion of said edges and a hermetic connection between the same by causing the fused glass or vitreous material of both edges to unite and form a continuous material.

The burners are exemplified as in substantial horizontal positions and projecting toward the blank position in substantially radial directions. (See Figs. 1, 2 and 19.) The burners are fed by a manifold 402 for gas and a manifold 403 for compressed air. The manifolds are held in a clamp 404 of a clamp-piece 405, (see Fig. 19) pivotally clamped in adjusted positions to a support 406 by means of a pivot-clamp 407. The support is extensible, as by making the same in a plurality of sections longitudinally adjustable with relation to each other, and held in adjusted positions by means of a clamp 408. Needle-valves 409, 410, extend through the respective manifolds and regulate the supply respectively of gas and air to the respective burners.

The manifold 402 connects with the gas main by means of a flexible hose 414 and a nipple-valve 415, the latter valve regulating the supply to the manifold. The manifold 403 connects by means of a flexible hose 416 with a branch 417 of a pipe 418, the latter extending from the compressed air main and having a valve 419 therein. The branch 417 has a regulating valve 420 therein. The other branch 421 of said pipe has a regulating valve 422 therein and connects with a flexible hose 423 extending from the air-manifold 403 at station 38. (See Figs. 1, 2, 3, 5 and 19.)

The plugs of the valves 420, 422, at the respective stations 37 and 38 are provided with arms 424, 425. A link 426 connects the arm 424 at station 37 with a lever 427, and a link 428 connects the arm 425 at station 38 with a lever 429, the said levers being pivoted by the pivot 392 to the frame and extending through slots 430, 431, of the arc-piece 396 at the controlling station 243.

The operator is enabled to observe the condition of the glass and the effect of its manipulation at the stations 36, 37 and 38. If the operator observes that the proper centrifugal motion of the mouth-edge of the inner member has taken place at station 36, the operator is enabled to send the blank at said station to the next station, which is a sealing-in station. A plurality of sealing stations is preferably provided so that proper continuity of action and proper action upon the respective blanks may take place without interruption in the work or in the passage of the blank from one station to the next, insuring rapidity of operation and prompt and proper completion of the steps of the method.

The operator is enabled to control the flames at the respective stations by the control levers for the burners at the various stations, which control levers are mounted at the control station. If the laying down of a flange by the centrifugal motion in the presence of heat is taking place more rapidly, the operator may either reduce the flame at the centrifugal station or increase the flames at the sealing stations, so that the flanges may be properly laid and sealed in sequence. If the condition of the glass or heat is such that the sealing operation is more rapid, the operator may reduce the intensity of the flames at either or both of the sealing stations, and thereby provide for proper sequence of completion of operations.

When the respective blanks at the centrifugal or sealing stations, or either of the same, are in proper condition to be advanced to the next station, the operator causes such advance by operating the treadle, thereby raising the centering device out of the blank and disengaging the latch 236, and then engaging the clutch 97.

It is desirable that the flames at the sealing stations, which provide high heat, shall be reduced while travel of the blanks is taking place. For accomplishing this, and also for regulating the time during which the rotating blanks at the sealing stations are subjected to the flames, I provide means for intermittently reducing the flames at the sealing stations. These means are exemplified as a lever 436, pivoted at 437 to a bracket 434 of a hanger 435 extending from the main frame and articulated at 438 with a link 439, articulated at 440 with an arm 441, extending rigidly from a movable member of the valve 419. (See Figs. 1, 2, 3, 5, 6, 7, 8 and 19.)

The lever has a roller 442 journaled thereon. The roller is arranged to contact a cam 445 being held thereagainst by a spring 446, extending from a hanger 444 on the frame.

The cam is shown as an adjustable cam, comprising cam-members 447, 448. (See Figs. 3, 6, 7 and 8.) The cam-member 447 is adjustable about a shaft 449, and fixed thereto in adjusted positions by a bolt 450. The cam-member 448 is adjustable on the cam-member 447 about the axis of the shaft, the cam-members being clamped together in adjusted positions by means of a bolt 451 passing into a threaded hole in one of said members and a slot 452 in the other member, a nut 453 clamping the parts in adjusted positions. The cam-members have cam-faces 454, 455, which are caused to approach or recede from each other by said adjustment, for determining the length of time during which the valve is open.

The valve is exemplified as the valve in the compressed air pipe, but if desired may be the valve in the gas pipe, or similar valves may be located in both said pipes. I prefer to place the valve in the compressed air pipe to reduce the volume of air projected against the seal rather than to reduce the gas, as thereby possible chilling of the seal is avoided. The reduction of the supply of air reduces the intensity of the flame.

The cam 445 is operated automatically, and in timed relation with the positioning of the blanks at the sealing stations, as by means of a pulley 461, fixed to the drive shaft 50. A belt 462 is received over this pulley, and a pulley 463 rotating about a stud-shaft 464 fixed in a bearing 465 of the hanger 435, secured to the frame. A pulley 467 is fixed to the pulley 463, shown as a grooved friction pulley, and coacts with a friction pulley 468 fixed to the shaft 449, which rotates in a bearing 470 of said bearing-piece. (See Figs. 3, 6, 7, 8).

I have in Figs. 33, 34, 35 and 36, shown a modification of the driving means for the carrier and of the control means for said driving means. In this modification the rod 226 is provided with a tappet 476 adjustable lengthwise thereof and clamped in adjustable positions by means of a bolt 477.

A clutch 479 comprises a sleeve 480 which has spline-connection 481 with the drive-shaft 50, which is in continuous motion. The other member of the clutch is on a gear 483 loose about the drive-shaft, but held away from the clutch sleeve 480 by means of a collar 484, fixed to the drive-shaft, a spring 485 about the drive-shaft normally separating the clutch-members. The gear 483 meshes with a gear 486 on the shaft 93, to which the pin-plate 86 of the Geneva movement device is secured.

The star-wheel of the Geneva movement device is secured to the carrier and rotates about the axis of rotation of the drive-shaft, in manner hereinbefore described.

The gear 486 is provided with tappets 488 located in diametrically opposite positions on said gear. A lever 489 is pivoted at 490 to a hanger 491, extending from the main frame, and is provided with a yoke 492 having pins 493 therein, which are received in an annular slot 494 in the clutch-sleeve 480. The lever is provided with a lug 496, with which the tappets 488 coact for moving the clutch-sleeve away from the gear 483, and thereby opening the clutch.

A lever 501 is pivoted at 502 to a hanger 503 on the frame. The proximate ends of the levers 489, 501, are connected by means of a spring 505, shown as a spiral bow spring, bowed about a pin 506 on the lever 489 the respective ends of the spring being received about pins 507, 508, on the respective levers.

When the tappet 476 is raised it raises the outer end of the outer lever 501, thereby depressing the inner end of said outer lever, and pulling the outer end of the inner lever 489 with it by means of the spring 505, the tappet being held in raised position by the riding of the latch 236 on the segment-bars 238.

In order to maintain the outer end of the outer lever above the tappet 476, a stop-pin 509 is fixed to the outer end of the inner lever and bears against the outer stretch of the spring 505 and limits relative movement in one direction between said levers. The spring serves as a safety device to permit release of the clutch 479 in case of undue resistance in the clutch.

When the carrier reaches its next at-rest position, the gear 486 is in such relation that one of the tappets 488 thereon rests upon the lug 496 for maintaining the clutch 479 in release relation, the rod 226 on which the tappet 476 is located being in raised relation. The centering device is also supported by this rod.

A bell-crank lever 512 is pivoted at 513 to a hanger 514, depending from the frame. A link 515 is articulated with the bell-crank lever at 516, and with a lever 517 at 518. The lever 517 is pivoted about the shaft 93. The lever 517 is provided with a pawl 519, normally urged into engagement with teeth 520 on the face of the gear 486, the pawl being urged into such engagement by means of a spring 521. There are two of the teeth 520 at diametrically opposite sides of the gear 486 positioned with relation to the tappets 488.

The bell-crank lever 512 is normally retracted by a spring 525, so that, when the rod 226 and tappet 476 are raised, the pawl 519 is placed in proper relation to engage one of the teeth 520 upon the next descent of said rod 226 and tappet 476. When the centering device is moved for centering the blank just positioned at the centering station 33, the tappet 476 is depressed for operating the bell-crank lever 512 whereby the pawl 519 engages one of the teeth 520 and rotates the gear 486 to just sufficient extent to move the tappet 488 out of coactive relation with the lug 496, so that the lever 489 is capable of being operated for causing engagement in the clutch 479 at the next upward movement of the tappet 476 for imparting an intermittent rotation of the carrier.

In employing my improved method, the mouth edge of the inner member is, preferably prior to being assembled with the outer member, provided with a flange 335, by rendering the mouth-end of the inner member plastic by heat from the burner 337 and laterally bending the mouth edge outwardly, as by the flanging tool 338. (See Figs. 20 and 21.) The inner member is assembled in the outer member in relation to form the space 23 between the same by means of the separators 24, the relation being preferably such that the flange 335 is located axially outwardly from the mouth edge of the outer member.

In the form of blank shown, the outer member, when in such assembled relation, is still provided with the skirt 26 intended later to be shaped about the bottom of the inner member, for forming the bottom of the outer member, which may be accomplished in suitable manner and at a desired point in the method of formation of the bottle, the subject-matter of the present invention being directed mainly to the sealing together of the mouth edges of the inner and outer members.

A machine is employed in the present exemplification of the invention, for aiding in performing certain steps of the method. The machine comprises an intermittently rotatable carrier 41, arranged to be intermittently rotated and held in at-rest positions by means of driving mechanism, including the clutch 97, the Geneva movement device 68, the latch 236, the slots 237, and the segment-bars 238 on the carrier. The clutch is arranged to be brought into engaging relation, either by the manually operated handle 228 or the treadle 242, for releasing the latch and engaging the clutch for intermittent motions of the carrier.

When the carrier is in at-rest position, the blank is arranged to be inserted into a chuck 81, of which there are preferably as many as there are at-rest positions of the carrier, the insertion of the blank taking place at one or the other of two charging stations 31, 32. The chuck is a rotatable chuck and comprises means to permit centering of the blank therein.

After the blank is inserted in the chuck, it is moved to a blank-centering station 33, at which a centering device 251 acts upon the inner and outer members of the blank to relatively center the mouth-edges of said members and to arrange said members in proper concentric relation, as well as to center the blank with relation to its axis of rotation. The centering device is arranged to be moved toward and from the blank axially with relation to the blank, and comprises inner centering members 261 and outer centering members 272, pivoted together and respectively having pivotal and sliding connections at their respective ends with the body of the centering device.

The centered blank next advances to a warming station 34, where the blank rotates in the presence of heat for annealing the mouth-ends of the members. This step may or may not be employed, as desired. In the next intermittent movement of the carrier, the blank passes to a pre-heating station 35, at which a high-heat flame is directed upon the mouth-ends of the members for rendering the same nearly plastic, preparatory to causing the mouth-edge of the inner member to meet the mouth-edge of the outer member.

At the next intermittent motion of the carrier the blank is moved to a station 36, termed a centrifugal station, at which the mouth-edge of the inner member is subjected to an intense heat for rendering the mouth-edge of the inner member plastic, and the blank is rotated at a high rate of speed to move said plastic mouth-edge of the inner member outwardly by centrifugal force and also preferably to cause the outer edge of the same to droop by gravity for causing the mouth-edge of the inner member to meet and preferably rest upon the mouth-edge of the outer member.

The blank next passes to one or more sealing stations 37, 38, at which the mouth-edges of the members of the blank, which are now juxtaposed, are subjected to heat of preferably a plurality of burners for fusing said edges and connecting the same as a fused joint for hermetically sealing the space 23 at the mouth-end of the blank. The blanks rotate during the sealing while being subjected to the heat, but preferably at a reduced rate of speed relatively to the speed of rotation employed while the mouth-edge of the inner member is moved outwardly by centrifugal force.

Means are provided for automatically determining the durations of application of the heat to the blanks at the sealing station or stations, exemplified by the means for automatically operating the valve 419, shown in Figs. 3, 6, 7 and 8, and means are also provided, exemplified by the levers 391, 427, 429, whereby the operator is enabled to adjust the intensity of the flames at the centrifugal station and at the sealing stations, so that the progress of the steps of the method may be uninterrupted regardless of variations there may be in the glass or in the speeds with which the steps of spreading the mouth-edge of the inner member by centrifugal force and of sealing the juxtaposed edges may be accomplished.

If the centering of the blank is done manually, it may be done by the same attendant who discharges and charges the blanks. The main operator is preferably at a position where he may view the stretching of the mouth-edge of the inner member by centrifugal force in the presence of heat, at the centrifugal station, and the sealing of the mouth-ends of the members, in the presence of heat, at the sealing stations, exemplified for instance by the operator's station 243.

Figure 4:
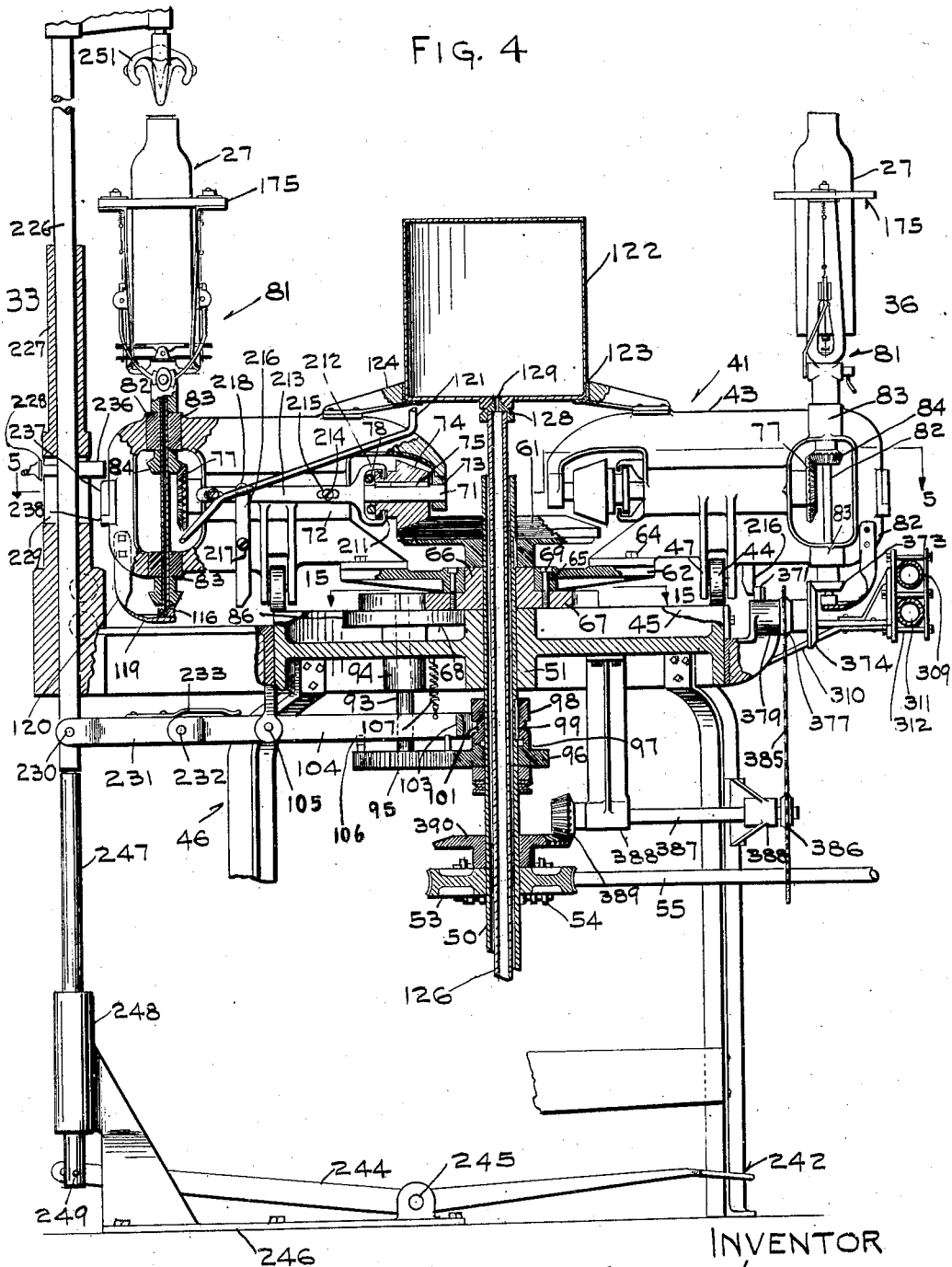
Fig. 4 is a vertical axial section of the apparatus taken on the irregular line 4—4 of Fig. 2.

The control means for controlling the latch for the carrier and intermittent operation of the carrier, and for centering the blank, are connected in such manner that the centering device must be out of the blank prior to the release of the latch and operation of the carrier, and safety means are also provided for moving the movable member of the driving means so that, if abnormal resistance is had in the rotation of the carrier, the said movable member will yield, instanced by the articulating connection 232 between the link 231 and the lever 104, and the spring 233 operating in conjunction therewith, shown in Figs. 1, 4 and 9, or by the means shown in the modification exemplified in Figs. 33 to 36 inclusive, shown as the two-part lever 489, 501, connected by the spring 505, the tappets 488 for definitely releasing the clutch 479, and the pawl 519 arranged to engage the teeth 520 having correlation with the tappets for moving the tappets out of clutch disengaging relation, by means of the tappet 476, which latter has connection with the rod 226 which supports the centering device 251.

Having thus fully described my invention, what I claim as new and desire to secure by Letters Patent, is:

1. The method of sealing the mouth-end of a double walled frangible vessel which consists in heating the ends to be sealed thereby rendering the same plastic and rotating said ends at a speed of rotation to produce spreading action by the inner edge upon the outer edge by centrifugal force.

2. The method of connecting proximate inner and outer edges of frangible material which consists in heating said edges to render the same plastic and spreading said inner edge upon said outer edge by centrifugal force.

3. The method of connecting proximate inner and outer edges of frangible material which consists in heating said edges to render the same plastic and spreading and drooping said inner edge upon said outer edge by centrifugal force and gravity.

4. The method of connecting proximate inner and outer edges of frangible material which consists in spreading said inner edge toward said outer edge by centrifugal force in the presence of heat.

5. The method of connecting proximate inner and outer edges of frangible material which consists in spreading said inner edge and causing the same to droop upon said outer edge by centrifugal force and gravity in the presence of heat.

6. The method of connecting proximate inner and outer edges of frangible material which consists in heating said edges to render said inner edge more plastic than said outer edge and rotating said edges at a high rate of speed to cause said inner edge to spread by centrifugal force.

7. The method of sealing the mouth-edge of a double-walled frangible vessel comprising an inner wall and an outer wall, which includes heating the mouth-edge of the inner wall and bending said heated edge laterally outward to form a flange, permitting said flanged edge to cool, and then again heating said mouth-edges of said inner wall and said outer wall and spreading said flange toward said mouth-edge of said outer wall by centrifugal force.

8. The method of sealing the mouth-edge of a double-walled frangible vessel comprising an inner wall and an outer wall, which includes heating the mouth-edge of the inner wall and bending said heated edge laterally outward to form a flange, permitting said flanged edge to cool, then again heating said mouth-edges of said inner wall and said outer wall and spreading said flange toward said mouth-edge of said outer wall by centrifugal force, and rotating said edges in the presence of heat to fuse the same together.

9. The method of sealing the mouth-edge of a double-walled frangible vessel comprising an inner wall and an outer wall, which includes heating the mouth-edge of the inner wall and bending said heated edge laterally outward to form a flange, permitting said flanged edge to cool, then again heating the mouth-edges of said inner wall and said outer wall and spreading said flange and causing the same to droop toward said mouth-edge of said outer wall by centrifugal force and gravity, and rotating said edges in the presence of heat to fuse the said edges together.

10. The method of sealing the mouth-edge of a double-walled frangible vessel comprising an inner wall and an outer wall, which includes associating said inner wall in said outer wall, rotating said associated walls, centering the same coincident with their axes of rotation, and heating the mouth-edges of said inner wall and said outer wall and applying greater heat to the mouth-edge of said inner wall and spreading said last-named mouth-edge toward said mouth-edge of said outer wall by centrifugal force.

11. The method of sealing the mouth-edge of a double walled frangible vessel comprising an inner wall and an outer wall, which includes rotating the mouth-edges of said inner wall and of said outer wall in the presence of heat, and then accelerating said rotations in the presence of higher heat directed with greater intensity upon said mouth-edge of said inner wall than upon the mouth-edge of said outer wall to render said mouth-edge of said inner wall more plastic than said mouth-edge of said outer wall and spreading said mouth-edge of said inner wall by centrifugal force toward said mouth-edge of said outer wall.

12. The method of sealing the mouth-edge of a double-walled frangible vessel comprising an inner wall and an outer wall, which includes rotating the mouth-edges of said inner wall and of said outer wall in the presence of heat, then accelerating said rotations in the presence of higher heat directed with greater intensity upon said mouth-edge of said inner wall than upon the mouth-edge of said outer wall to render said mouth-edge of said inner wall more plastic than said mouth-edge of said outer wall and spreading said mouth-edge of said inner wall by centrifugal force toward said mouth-edge of said outer wall, and then rotating both said mouth-edges in the presence of heat to fuse the same together.

13. The method of sealing the mouth-edge of a double walled frangible vessel comprising an inner wall and an outer wall, which includes associating said inner wall in said outer wall by means of permanent separators between said walls to correlate said walls, rotating said associated walls, centering said walls about their axes of rotation by employing said separators as fulcrums, accelerating the rotations of said walls in the presence of heat applied with greater intensity upon said mouth-edge of said inner wall to spread said last-named mouth-edge toward said mouth-edge of said outer wall by centrifugal force, and fusing said edges together by rotation at less speed in the presence of heat.

14. The method of sealing the mouth-edge of a double-walled frangible vessel comprising an inner wall and an outer wall, which includes associating said inner wall in said outer wall by means of permanent separators, rotating said associated walls, centering said walls about their axes of rotation by employing said separators as fulcrums, rotating said associated centered walls in the presence of heat applied with greater intensity upon said mouth-edge of said inner wall to spread said last-named mouth-edge toward said mouth-edge of said outer wall by centrifugal force, and fusing said edges together by rotations in the presence of successive heats.

15. The method of sealing the mouth-edge of a double-walled frangible vessel comprising an inner wall and an outer wall, which includes heating the mouth-edge of the inner wall and bending said heated edge laterally outward to form a flange, associating said inner wall in said outer wall by means of permanent separators, rotating said associated walls, centering said associated walls about their axes of rotation by employing said separators as fulcrums, rotating said associated centered walls in the presence of heat applied with greater intensity upon said flange to move said flange toward said mouth-edge of said outer wall, and fusing said edges together by rotation in the presence of successive heat.

16. In apparatus for manufacturing glassware of the character described, the combination of a carrier, blank-supports thereon, means for intermittently moving said carrier and locating the same in at-rest positions, manual control means for said last-named means, means for rotating said blank-supports, an operating tool arranged to be received on a rotating blank while said carrier is in at-rest position, and means for removing said tool from said blank having connection with said manual control means.

17. In apparatus for manufacturing glassware of the character described, the combination of a carrier, blank-supports thereon for preformed, means for intermittently moving said carrier and locating the same in at-rest positions, manual control means for the latter, means for rotating said blank-supports, a centering tool coacting with the preformed blank in at-rest position to center said preformed blank in its blank support, and means having connection with said tool and with said manual control means causing disengagement between said tool and the blank.

18. In apparatus for manufacturing glassware of the character described, the combination of a rotary carrier, blank-supports thereon, means for intermittently rotating said carrier and locating the same in at-rest position comprising a movable driving member, means for rotating said blank-supports, an operating tool arranged to be received upon a rotating blank while said blank rotates in at-rest position, and control means for said movable driving member having connection with said operating tool for moving said tool.

19. In apparatus for manufacturing glassware of the character described, the combination of a rotary carrier, blank-supports thereon, means for intermittently rotating said carrier, means for rotating said blank-supports, a stop for said carrier, and a centering tool for centering the blanks in said blank supports having connection with said stop, and constructed and arranged for combinedly moving said centering tool out of coacting relation with the blank and said stop out of coacting relation with said carrier.

20. In apparatus for manufacturing glassware of the character described, the combination of a rotary carrier, blank-supports thereon, means for intermittently rotating said carrier comprising a movable driving member, means for rotating said blank-supports, a centering tool for centering the blanks in said blank supports, a stop for said carrier, and control means having connection with said centering tool, said movable driving member and said stop for combinedly moving the said centering tool, said movable driving means and said stop.

21. In apparatus for manufacturing glassware of the character described, the combination of a rotary carrier, blank-supports thereon, means for intermittently rotating said carrier comprising a movable driving member, means for rotating said blank-supports, a stop for said carrier, an operating tool arranged to be received upon a rotating blank while said blank is in at-rest position, and control means having connection with said movable driving member, with said stop and with said operating tool for simultaneously moving the same, and arranged for disengagement of the operating tool from the blank prior to disengagement of the stop from the carrier and release of said movable driving member from driving connection during one continuous movement of said control means.

22. In apparatus for manufacturing glassware of the character described, the combination of a carrier, blank-supports thereon, means for intermittently moving said carrier and locating the same in at-rest positions including a movable driving member, means for rotating said blank-supports, an operating tool arranged to be received upon a rotating blank while said carrier is in at-rest position, and treadle means and hand operated means operating said movable driving member and said operating tool.

23. In apparatus for manufacturing glassware of the character described, the combination of a carrier, blank-supports thereon, means for intermittently moving said carrier and locating the same in at-rest positions, a centering tool coacting with a blank in at-rest position, a support for the latter, treadle means to move said support for disengagement of said centering tool with the blank, and means for mounting said centering tool on said support for hand movement of said centering tool toward said blank.

24. In apparatus for manufacturing glassware of the character described, the combination of a rotary carrier, blank-supports thereon, means for intermittently rotating said carrier, a stop for holding said carrier in at-rest positions, means for rotating said blank-supports, a centering tool coacting with a blank in at-rest position, a support therefor having connection with said stop, an operating part for combinedly operating said stop and said support, and connections between said centering tool and said support for manual movement of said centering tool with relation to said support and the blank in at-rest position.

25. In apparatus for manufacturing glassware of the character described, the combination of a rotary carrier, blank-supports thereon, means for intermittently rotating said carrier and locating the same in at-rest positions, means for rotating said blank-supports in at-rest positions, a centering tool whose longitudinal axis is coincident with the axis of rotation of said blank-support rotating in an at-rest position with which it coacts, and means for moving said centering tool toward and from said blank-support in the line of said axes.

26. In apparatus for manufacturing glassware of the character described, the combination of a rotary carrier, blank-supports thereon, means for intermittently rotating said carrier and locating the same in at-rest positions, means for rotating said blank-supports in at-rest positions, a centering means for the rotating blank supported by one of said blank-supports in an at-rest position, a support for said centering means locating the longitudinal axis of said centering means coincident with the axis of rotation of said last-named blank-support, said centering means comprising movable members, and means for relatively movably mounting said movable members at a plurality of points about said axes to cause combined approach and combined recession of said members.

27. In apparatus for manufacturing glassware of the character described, the combination of a carrier, blank-supports thereon, means for moving said carrier, means for rotating said blank-supports, centering means coacting with the blanks supported by said blank-supports, heating means for the blanks, and means for accelerating rotation of said blank-supports at said heating means.

28. In apparatus for manufacturing glassware of the character described, the combination of a carrier, blank-supports thereon, means for moving said carrier, means for rotating said blank-supports, centering means coacting with the blanks supported by said blank-supports, heating means for the blanks, means for accelerating rotation of said blank-supports at said heating means, and sealing means for said blanks comprising heating means and means for rotating said blanks at less speed than said accelerated speed.

29. In apparatus for manufacturing glassware of the character described, the combination of a carrier, blank-supports thereon, means for moving said carrier, means for rotating said blank-supports, centering means coacting with the blanks supported by said blank-supports, heating means for the blanks, means for accelerating rotation of said blank-supports at said heating means, sealing means for said blank comprising heating means and means for rotating said blanks at less speed than said accelerated speed, and means for automatically controlling the heat of said last-named heating means.

30. In apparatus for manufacturing glassware of the character described, the combination of a carrier, blank-supports thereon, means for moving said carrier, stations including a preheating station, a centrifugal station and a sealing station, heating means at each of said stations, and means at each of said stations for rotating said blank-supports during application of said heating means to the blanks supported by said blank-supports, said last-named means including means at said centrifugal station for rotating the blank-support at said station at an increased speed with relation to the speeds of rotation at the others of said stations.

31. In apparatus for manufacturing glassware of the character described, the combination of a carrier, blank-supports thereon, means for moving said carrier, stations including a centrifugal station and a plurality of sealing stations, heating means for the blank at each of said stations, means for rotating said blank-supports at each of said stations for rotation of the blanks in the presence of heat at said respective stations, and collective means at a common point and connections therefor to said respective heating means for separately controlling said respective heating means.

32. In apparatus for manufacturing glassware of the character described, the combination of a carrier, blank-supports thereon, means for moving said carrier, stations including a centrifugal station and a plurality of sealing stations, heating means for the blank at each of said stations, means for rotating said blank-supports at each of said stations for rotation of the blanks in the presence of heat at said respective stations, collective means at a common point and connections therefor to said respective heating means for separately controlling said respective heating means, and means for automatically controlling said heating means at said sealing stations.

33. In apparatus for manufacturing glassware of the character described, the combination of a carrier, blank-supports thereon, means for moving said carrier, stations including a centrifugal station and a plurality of sealing stations, heating means for the blank at each of said stations, means for rotating said blank-supports at each of said stations for rotation of the blanks in the presence of heat at said respective stations, collective means at a common point and connections therefor to said respective heating means for separately controlling said respective heating means, means for automatically controlling said heating means at said sealing stations, and means for adjusting said last-named means to adjust the duration of heat application at said sealing stations.

34. In apparatus for manufacturing glassware of the character described, the combination of a carrier, blank-supports thereon, heating means for the blanks supported by said blank-supports, means for moving said carrier to locate the blanks supported by said blank-supports successively at said heating means, said heating means arranged for application of intense heat to the edge of the blank, and means for rotating the blank-support supporting said blank at a high rate of speed to cause said heated edge of said blank to spread by centrifugal force.

35. In apparatus for manufacturing glassware of the character described, the combination of a carrier, blank-supports thereon, heating means for the blanks supported by said blank-supports, means for intermittently moving said carrier to locate the blanks supported by said blank-supports successively in an at-rest position at said heating means, said heating means arranged for application of intense heat to the edge of the blank, means for rotating the blank-support supporting said blank at a high rate of speed to cause said heated edge of said blank to spread by centrifugal force, and control means at said heating means for controlling intermittent movements of said carrier.

36. In means for manufacturing glassware of the character described, the combination of a carrier, blank-supports thereon, driving means for intermittently moving said carrier and locating the same in at-rest positions at a plurality of stations, said stations including a blank-centering station, a centrifugal station, and a plurality of sealing stations, a blank centering means at said centering station, heating means at said centrifugal station, heating means at each of said sealing stations, an operator's station between said centrifugal station and one of said sealing stations, means proximate to said operator's station having connection with each of said heating means for separately controlling the same, and control means at said operator's station having connection with said driving means and said blank centering means for respectively controlling the same.

37. In means for manufacturing glassware of the character described, the combination of a carrier, blank-supports thereon, driving means for intermittently moving said carrier and locating the same in at-rest positions at a plurality of stations, said stations including a blank-centering station, a centrifugal station and a plurality of sealing stations, a blank centering means at said blank-centering station, heating means at said centrifugal station, heating means at each of said sealing stations, an operator's station between said centrifugal station and one of said sealing stations, means proximate to said operator's station having connection with each of said heating means for separately controlling the same, control means at said operator's station having connection with said driving means and said blank centering means for respectively controlling the same, and means for rotating said blank-supports at said centrifugal station and at said sealing stations, said means comprising means for rotating the blank-support at said centrifugal station with accelerated speed with relation to the speeds of rotation of the blank-supports at said sealing stations.

38. In apparatus for manufacturing glassware of the character described, the combination of a rotary carrier, blank-supports mounted thereon, operating stations located about said carrier, and means for automatically rotating said blank-supports at relatively different speeds at different of said stations.

39. In aparatus for manufacturing glassware of the character described, the combination of a rotary carrier, blank-supports mounted thereon, operating stations located about said carrier, shafts for rotating said blank-supports, an inner driving gear, releasable driving means between said respective shafts and said inner driving gear, an outer driving gear at one of said operating stations arranged for coaction with said respective shafts when located at said one of said operating stations, and means at said last-named station whereby driving connection for said last-named shaft is transferred from said inner driving gear to said last-named driving gear for rotating said last-named shaft at an accelerated speed.

40. In apparatus for manufacturing glassware of the character described, the combination of a rotary carrier, blank-supports mounted thereon, operating stations located about said carrier, relatively radially extending shafts for rotating said blank-supports, a central driving gear for rotating said shafts, releasable driving connection between the inner ends of said respective shafts and said central driving gear, a driving gear at one of said operating stations arranged for coaction with said respective blank-supports when located at said one of said operating stations for rotating said respective blank-supports at accelerated speed, and means at said last-named station whereby driving connection between said central driving gear and said radially extending shaft is released and operative connection between said second-named driving gear and said blank-support is formed.

41. In apparatus for manufacturing glassware of the character described, the combination of a rotary carrier, operating stations located about said carrier, relatively radially extending shafts on said carrier, a central driving gear for rotating said shafts, releasable driving connection between the inner ends of said shafts and said central driving gear, upright shafts geared to said respective radially extending shafts, gears thereon, blank-supports rotated by said upright shafts, accelerating gearing at one of said operating stations coöperating with said last-named gears for rotating said blank-supports when located at said one of said operating stations at accelerated speed, and heating means for the blank at said one of said operating stations.

42. In apparatus for manufacturing glassware of the character described, the combination of a rotary carrier, operating stations located about said carrier, relatively radially extending shafts on said carrier, a central driving gear for rotating said shafts, releasable driving connection between the inner ends of said shafts and said central driving gear, upright shafts geared to said respective radially extending shafts, gears thereon, blank-supports rotated by said upright shafts, accelerating gearing at one of said operating stations including a driving gear for said last-named gears, means for resiliently urging said driving gear toward said respective last-named gears when located at said one of said operating stations for rotating said blank-support at accelerated speed, and means at said one of said operating stations releasing said releasable driving connection.

43. In apparatus for manufacturing glassware of the character described, the combination of a rotary carrier, blank-supports mounted thereon, operating stations located about said carrier, means for intermittently rotating said carrier comprising a movable driving member, a tappet located on a rotating member of said last-named means for releasing said movable driving member, and means for moving said tappet for operative engagement of said movable driving member.

44. In apparatus for manufacturing glassware of the character described, the combination of a rotary carrier, blank-supports mounted thereon, operating stations located about said carrier, a centering means located at one of said stations, driving means for intermittently rotating said carrier comprising a movable driving member and a rotating member, means including a yielding member for moving said movable driving member into operative relation, a tappet located on said rotating member for releasing said movable driving member, positioning means for said rotating member for positioning said tappet in release position, and reciprocating means for operating said centering means comprising means for operating said yielding member in one of its directions of movement and for operating said positioning means in its opposite direction of movement.

45. In apparatus of the character described, the combination of a rotary carrier, blank-supports comprising suction-chucks, shafts provided with passages communicating with said suction-chucks for rotating said blank-supports, a plurality of driving means respectively arranged for operative connection with said shafts at different points about said carrier for driving said shafts at different speeds, automatic means whereby said respective driving means are automatically connected with and released from said respective shafts, and suction means having connection with said passages.

46. In apparatus for manufacturing glassware comprising a blank comprising an inner member and an outer member having separating means therebetween to form a space between said members, the combination of a suction-chuck arranged to act on one end of said inner member, positioning means for the same end of said outer member, and centering means for the other end of said members acting outwardly on said inner member and inwardly on said outer member to relatively move said members on said separating means as pivoting means.

47. In apparatus for manufacturing glassware comprising a blank comprising an inner member and an outer member having separating means therebetween to form a space between said members, the combination of a suction-chuck arranged to act on one end of said inner member, positioning means for the same end of said outer member, centering means for the other end of said members acting outwardly on said inner member and inwardly on said outer member to relatively move said members on said separating means as pivoting means, means for rotating said suction-chuck and positioning means, and means for mounting said centering means to locate the longitudinal axis of said centering means coincident with the axes of rotation of said suction-chuck and positioning means.

48. In apparatus for manufacturing glassware comprising a blank comprising an inner member and an outer member having separating means therebetween distanced from the respective ends of said members to form a space between said members, the combinations of blank-holding means for said blank comprising a suction-chuck for said inner member and a slidable clamp for said outer member at the respective sides of the position of said separating means.

49. In apparatus for manufacturing glassware comprising a blank comprising an inner member and an outer member having separating means therebetween distanced from the respective ends of said members to form a space between said members, the combination of blank-holding means for said blank comprising a suction-chuck for said inner member and a slidable clamp for said outer member at the respective sides of the position of said separating means, and centering means acting in opposite directions on both said members.

50. In apparatus for manufacturing glassware of the character described, the combination of a carrier, blank-supports thereon arranged to support blanks comprising an inner member and an outer member, and centering means coacting with the respective members of said blanks supported by said blank-supports comprising a frame, arms having outer centering faces coacting with the inner faces of said inner member, and arms having inner centering faces coacting with the outer faces of said outer member, one of the ends of said first-named arms pivoted to said frame, the other of the ends of said first-named arms pivoted to said second-named arms intermediate of the ends of the latter, and the inner ends of said second-named arms having pivotal and slide connections with said frame.

51. In apparatus for manufacturing glassware of the character described, the combination of a carrier, blank-supports thereon arranged to support blanks comprising an inner member and an outer member, and centering means coacting with the respective members of said blanks supported by said blank-supports comprising a frame, arms having outer centering faces coacting with the inner faces of said inner member, arms having inner centering faces coacting with the outer faces of said outer member, one of the ends of said first-named arms pivoted to said frame, the other of the ends of said first-named arms pivoted to said second-named arms intermediate of the ends of the latter, and the inner ends of said second-named arms having pivotal and slide connections with said frame, and spring means for resiliently moving said inner ends
5 of said second-named arms toward said first-named ends of said first-named arms.

In testimony whereof, I have hereunto signed my name in the presence of two subscribing witnesses.

ERICK P. LINDAHL.

Witnesses:
    JAMES J. FITZPATRICK,
    THERESA M. SILBER.